(12) United States Patent
Pednault

(10) Patent No.: US 7,283,982 B2
(45) Date of Patent: Oct. 16, 2007

(54) METHOD AND STRUCTURE FOR TRANSFORM REGRESSION

(75) Inventor: Edwin Peter Dawson Pednault, Cortlandt Manor, NY (US)

(73) Assignee: International Business Machines Corporation, Armonk, NY (US)

(*) Notice: Subject to any disclaimer, the term of this patent is extended or adjusted under 35 U.S.C. 154(b) by 572 days.

(21) Appl. No.: 10/727,578

(22) Filed: Dec. 5, 2003

(65) Prior Publication Data

US 2005/0125474 A1 Jun. 9, 2005

(51) Int. Cl.
  G06F 15/18 (2006.01)
  G06F 15/00 (2006.01)
(52) U.S. Cl. ............................. 706/12; 706/21; 706/15
(58) Field of Classification Search .................. 706/16, 706/25, 62, 12, 14, 15, 21; 700/29, 30, 31, 700/44; 705/4, 7; 708/400
See application file for complete search history.

(56) References Cited

U.S. PATENT DOCUMENTS

| | | | | |
|---|---|---|---|---|
| 6,388,592 B1* | 5/2002 | Natarajan | | 341/107 |
| 6,519,534 B2* | 2/2003 | Chen et al. | | 702/34 |
| 6,523,015 B1 | 2/2003 | Bera et al. | | |
| 6,728,695 B1* | 4/2004 | Pathria et al. | | 707/2 |
| 6,810,368 B1* | 10/2004 | Pednault | | 703/2 |
| 7,020,593 B2* | 3/2006 | Hong et al. | | 703/2 |
| 7,133,811 B2* | 11/2006 | Thiesson et al. | | 703/2 |
| 2003/0020777 A1* | 1/2003 | Su et al. | | 347/19 |
| 2003/0033587 A1* | 2/2003 | Ferguson et al. | | 717/104 |
| 2003/0046130 A1* | 3/2003 | Golightly et al. | | 705/7 |
| 2003/0088565 A1* | 5/2003 | Walter et al. | | 707/6 |
| 2003/0140023 A1* | 7/2003 | Ferguson et al. | | 706/21 |
| 2003/0176931 A1* | 9/2003 | Pednault et al. | | 700/31 |
| 2003/0200188 A1* | 10/2003 | Moghaddam | | 706/25 |
| 2003/0204508 A1* | 10/2003 | Cantu-Paz et al. | | 707/100 |
| 2004/0015386 A1* | 1/2004 | Abe et al. | | 705/10 |
| 2004/0019598 A1* | 1/2004 | Huang et al. | | 707/100 |
| 2004/0181441 A1* | 9/2004 | Fung et al. | | 705/7 |
| 2004/0215551 A1* | 10/2004 | Eder | | 705/38 |
| 2004/0249779 A1* | 12/2004 | Nauck et al. | | 706/47 |
| 2005/0033719 A1* | 2/2005 | Tirpak et al. | | 707/1 |
| 2005/0096950 A1* | 5/2005 | Caplan et al. | | 705/7 |
| 2005/0119922 A1* | 6/2005 | Eder | | 705/7 |

OTHER PUBLICATIONS

Jerome H. Friedman, "Stochastic Gradient Boosting," Technical Report, Dept. of Statistics, Stanford Univeristy, Mar. 26, 1999.

(Continued)

Primary Examiner—Anthony Knight
Assistant Examiner—Adrian Kennedy
(74) Attorney, Agent, or Firm—Stephen C. Kaufman, Esq.; McGinn IP Law Group, PLLC

(57) ABSTRACT

A predictive model method (and structure) includes receiving an input data into an initial model to develop an initial model output and receiving both of the input data and the initial model output as input data into a first transform/regression stage.

19 Claims, 15 Drawing Sheets

OTHER PUBLICATIONS

Jerome H. Friedman, "Greedy Function Approximation: A Gradient Boosting Machine," IMS 1999 Reitz Lecture, Technical Report, Dept. of Statistics, Stanford University, Feb. 24, 1999 (modified Mar. 15, 2000 and Apr. 19, 2001).

"KXEN Analytic Framework." description of a product listed on the KXEN (Knowledge Extracting Engines), Inc. website (www.kxen.com), 2002-2003.

"KXEN Key Components," summary of key components of products listed on the KXEN (Knowledge Extracting Engines), Inc. website (www.kxen.com), 2002-2003.

"KXEN Consistent Code (K2C)," a key component of products listed on the KXEN (Knowledge Extracting Engines), Inc. website (www.kxen.com), 2002-2003.

"KXEN Robust Regression (K2R)," a key component of products listed on the KXEN (Knowledge Extracting Engines), Inc. website (www.kxen.com), 2002-2003.

Ramesh Natarajan and Edwin P.D. Pednault, "Segmented Regression Estimators for Massive Data Sets," In Proceedings of the SIAM International Conference on Data Mining, Crystal City, Virginia, USA, Apr. 2002.

* cited by examiner

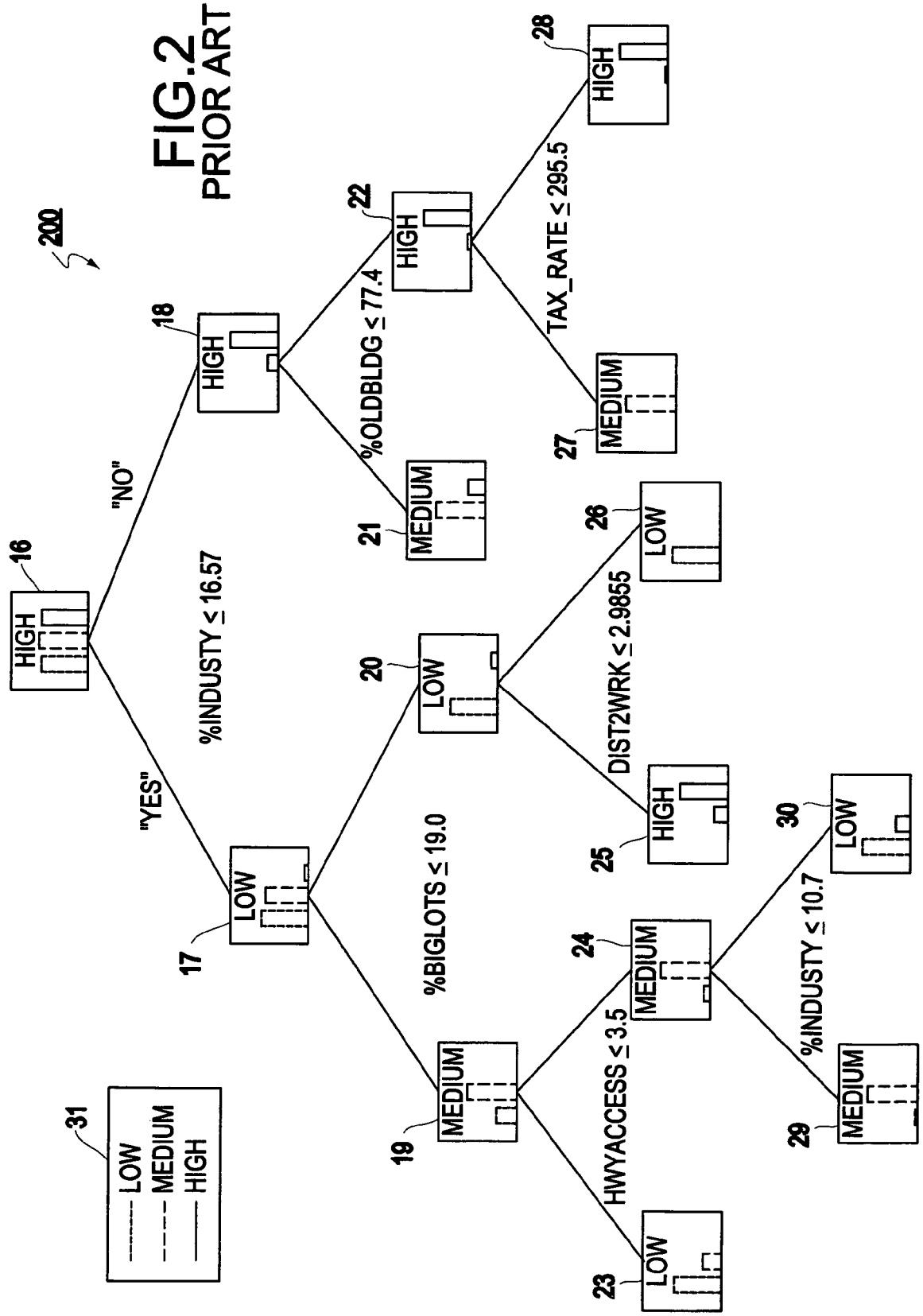

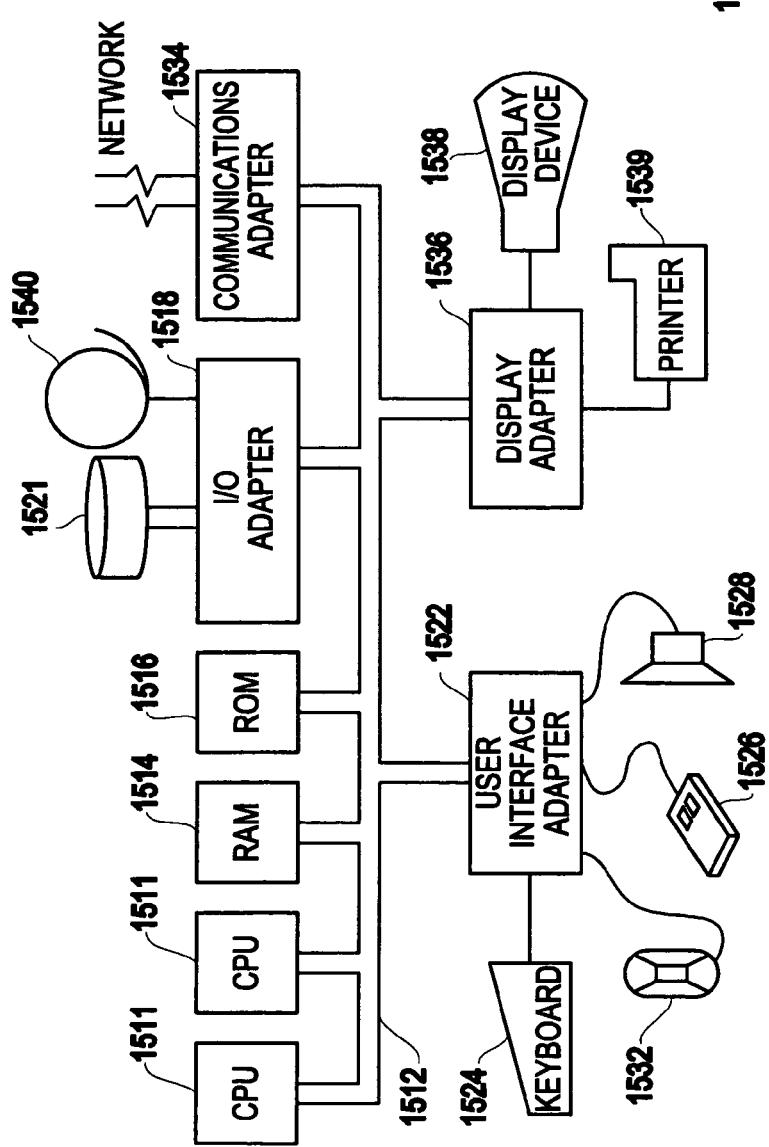
FIG. 16
FIG. 15
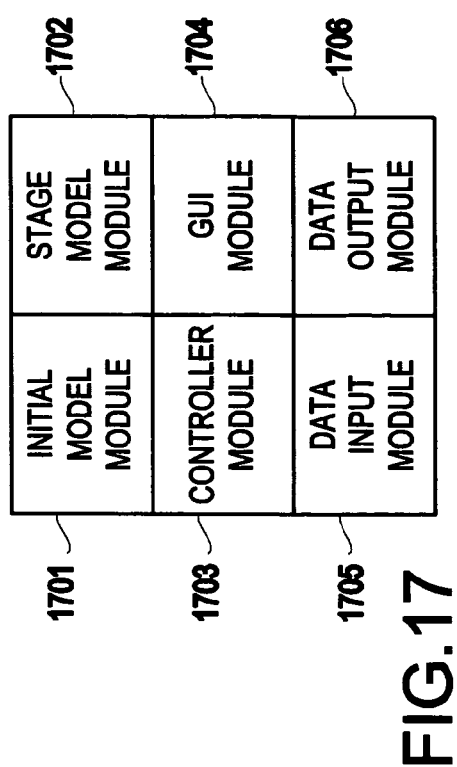
FIG. 17

METHOD AND STRUCTURE FOR TRANSFORM REGRESSION

CROSS-REFERENCE TO RELATED APPLICATIONS

The present Application is related to the following co-pending applications:

U.S. patent application Ser. No. 10/096,474, filed on Mar. 11, 2002, to Natarajan et al., entitled "Method for Constructing Segmentation-Based Predictive Models", assigned to the present assignee, and incorporated herein by reference.

BACKGROUND OF THE INVENTION

1. Field of the Invention

The present invention generally relates to data mining and knowledge discovery of computer databases. More specifically, an output of the first stage becomes an input to a second stage in a predictive model in which nonlinear transformations of input variables are automatically discovered and in which such transformed inputs are then combined via linear regression to stage-wise produce predictions/forecasts.

2. Description of the Related Art

Data mining is emerging as a highly advantageous application of computer databases that addresses the problem of extracting useful information from large volumes of data. Predictive modeling is an area of data mining and knowledge discovery that is specifically directed toward automatically extracting data patterns that have predictive value. Constructing accurate predictive models is a significant problem in many industries that employ predictive modeling in their operations.

For example, predictive models are often used for direct-mail targeted-marketing purposes in industries that sell directly to consumers. The models are used to optimize return on marketing investment by ranking consumers according to their predicted responses to promotions, and then mailing promotional materials only to those consumers who are most likely to respond and generate revenue.

The credit industry uses predictive modeling to predict the probability that a consumer or business will default on a loan or a line of credit of a given size based on what is known about that consumer or business. The models are then used as a basis for deciding whether to grant (or continue granting) loans or lines of credit, and for setting maximum approved loan amounts or credit limits.

Insurance companies use predictive modeling to predict the frequency with which a consumer or business will file insurance claims and the average loss amount per claim. The models are then used to set insurance premiums and to set underwriting rules for different categories of insurance coverage.

On the Internet, predictive modeling is used by ad servers to predict the probability that a user will click-through on an advertisement based on what is known about the user and the nature of the ad. The models are used to select the best ad to serve to each individual user on each Web page visited in order to maximize click-though and eventual conversion of user interest into actual sales.

The above applications are but a few of the innumerable commercial applications of predictive modeling. In all such applications, the higher the accuracy of the predictive models, the greater are the financial rewards.

Because the data-mining/knowledge-discovery problem is broad in scope, any technology developed to address this problem should ideally be generic in nature, and not specific to particular applications. In other words, one should ideally be able to supply a computer program embodying the technology with application-specific data, and the program should then identify the most significant and meaningful patterns with respect to that data, without having to also inform the program about the nuances of the intended application.

The development of application-independent predictive modeling technology is made feasible by the fact that the inputs to a predictive model (i.e., the explanatory data fields) can be represented as columns in a database table or view. The output(s) of a predictive model can likewise be represented as one or more columns.

To automatically construct a predictive model, one first prepares a table or view of training data comprising one or more columns of explanatory data fields together with one or more columns of data values to be predicted (i.e., target data fields). A suitable process must then be applied to this table or view of training data to generate predictive models that map values of the explanatory data fields into values of the target data fields. Once generated, a predictive model can then be applied to rows of another database table or view for which the values of the target data fields are unknown, and the resulting predicted values can then be used as a basis for decision making.

Thus, a process for constructing a predictive model is essentially a type of database query that produces as output a specification of a desired data transformation (i.e., a predictive model) that can then be applied in subsequent database queries to generate predictions.

To make predictive modeling technology readily available to database applications developers, extensions to the SQL database query language are being jointly developed by the International Organization for Standardization (ISO) and the International Electrotechnical Commission (IEC) to support the construction and application of predictive models within database systems (see, for example, ISO/IEC FCD 13249-6:200x(E), "Information technology—Database languages—SQL Multimedia and Application Packages—Part 6: Data Mining," Document Reference Number ISO/IEC JTC 1/SC 32N0848, Jun. 20, 2002, (Final Draft International Standard) http://www.jtc1sc32.org/sc32/jtc1sc32.nsf/Attachments/39E375F33B51135788256BDD00835045/ $FILE/32N0848.PDF.

For an overview, see J. Melton and A. Eisenberg, "SQL Multimedia and Application Packages (SQL/MM)," SIGMOD Record, Vol. 30, No. 4, pp. 97-102, 2001, http://www.acm.org/sigmod/record/issues/0112/standards.pdf). This ISO/IEC standard aims to provide SQL structured types and associated functions for creating data mining task specifications, executing data mining tasks, querying data mining results, and, in cases where the results are predictive models, applying data mining results to row data to generate predictions.

For example, the ISO/IEC standard requires that both data mining task specifications and data mining results be stored as Character Large Objects (CLOBs), using an encoding format that is consistent with the Predictive Modeling Markup Language (PMML) standard that is being developed separately through the Data Mining Group (http://www.d-mg.org). The ISO/IEC standard likewise specifies sets of functions to be used for manipulating these database objects. By providing a standard application programming interface (API) for utilizing data mining technology with database systems, the standard is expected to promote wide use of data mining technology by enabling database application developers to readily apply such technology in business applications simply by writing SQL queries. In so doing, the standard effectively makes data mining a component technology of database systems.

The ISO/IEC data mining standard likewise serves a clear acknowledgment that predictive model technology produces useful, concrete, and tangible results that have specific meaning with respect to the input data and the user-specified modeling objectives (i.e., which data field to predict in terms of which other data fields). Indeed, if this were not the case, there would be no reason to create an international database standard for utilizing such technology. From a pragmatic database perspective, the specification of the input data and the modeling objectives constitutes a query, and the predictive model that is produced as output constitutes a query result. The processes provided by predictive modeling technology are utilized by the query engine in order to produce the query results.

Decision-tree classifiers provide a convenient illustration of the usefulness of predictive modeling technology. Well-known procedures exist for constructing such models. The usual method is summarized as follows by Quinlan (see J. R. Quinlan, "Unknown attribute values in induction," *Proceedings of the Sixth International Machine Learning Workshop*, pp 164-168, Morgan Kaufmann Publishers, 1989):

"The 'standard' technique for constructing a decision tree classifier from a training set of cases with known classes, each described in terms of fixed attributes, can be summarized as follows:

If all training cases belong to a single class, the tree is a leaf labeled with that class;

Otherwise:
    select a test, based on one attribute, with mutually exclusive outcomes;
    divide the training set into subsets, each corresponding to one outcome; and
    apply the same procedure to each subset."

Details on the individual method steps can be found, for example, in the on-line statistics textbook provided over the Internet as a public service by StatSoft, Inc.

The usefulness of decision tree technology is best illustrated by means of a concrete example. Table 1 below shows the data field definitions for a data set commonly known within the predictive modeling community as the "Boston Housing" data (D. Harrison and D. L. Rubinfield, "Hedonic prices and the demand for clean air," *Journal of Environmental Economics and Management*, Vol. 5, pp 81-102, 1978). Table 2 below shows twelve exemplary of the rows from this data set. A complete copy of the data set can be obtained over the Internet from the UCI Machine Learning Repository (http://www.ics.uci.edu/~mlearn/MLRepository.html).

TABLE 1

(Data definition for the Boston Housing data set. Data fields have been assigned more intuitive names. The original names appear in the "a.k.a." column.)

| Data Field | a.k.a. | Description |
| --- | --- | --- |
| PRICE | MEDV | Median value of owner-occupied homes (recoded into equiprobable HIGH, MEDIUM, and LOW ranges) |
| ON_RIVER | CHAS | Charles River indicator (value is 1 if tract bounds Charles River; else 0) |
| CRIME_RT | CRIM | Per capita crime rate by town |
| %BIGLOTS | ZN | Percentage of residential land zoned for lots over 25,000 square feet |

TABLE 1-continued (Data definition for the Boston Housing data set. Data fields have been assigned more intuitive names. The original names appear in the "a.k.a." column.)

| Data Field | a.k.a. | Description |
| --- | --- | --- |
| %INDUSTY | INDUS | Percentage of non-retail business acres per town |
| NOXLEVEL | NOX | Concentration of nitric oxides (recoded into equiprobable high, medium, and low ranges) |
| AVGNUMRM | RM | Average number of rooms per dwelling |
| %OLDBLDG | AGE | Percentage of owner-occupied units built prior to 1940 |
| DIST2WRK | DIS | Weighted distances to five Boston employment centers |
| HWYACCES | RAD | Index of accessibility to radial highways |
| TAX_RATE | TAX | Full-valued property tax rate per $10,000 |
| CLASSIZE | PTRATIO | Pupil-teacher ratio by town |
| %LOWINCM | LSTAT | Percent lower status of the population |

TABLE 2(a)

(Twelve sample rows from the Boston Housing data set (Part 1 of 3).)

| ROW | PRICE | ON_RIVER | CRIME_RT | %BIG-LOTS | %INDUSTY |
| --- | --- | --- | --- | --- | --- |
| 1 | HIGH | 0 | 0.006 | 18.00 | 2.31 |
| 2 | MEDIUM | 0 | 0.027 | 0.00 | 7.07 |
| 3 | HIGH | 0 | 0.032 | 0.00 | 2.18 |
| 4 | MEDIUM | 0 | 0.088 | 12.50 | 7.87 |
| 5 | LOW | 0 | 0.211 | 12.50 | 7.87 |
| 6 | MEDIUM | 0 | 0.630 | 0.00 | 8.14 |
| 7 | MEDIUM | 0 | 0.154 | 25.00 | 5.13 |
| 8 | MEDIUM | 0 | 0.101 | 0.00 | 10.01 |
| 9 | LOW | 0 | 0.259 | 0.00 | 21.89 |
| 10 | LOW | 1 | 3.321 | 0.00 | 19.58 |
| 11 | LOW | 0 | 0.206 | 22.00 | 5.86 |
| 12 | LOW | 1 | 8.983 | 0.00 | 18.10 |

TABLE 2(b)

(Twelve sample rows from the Boston Housing data set (Part 2 of 3).)

| ROW | NOXLEVEL | AVGNUMRM | %OLDBLDG | DIST2WRK |
| --- | --- | --- | --- | --- |
| 1 | medium | 6.58 | 65.20 | 4.09 |
| 2 | low | 6.42 | 78.90 | 4.97 |
| 3 | low | 7.00 | 45.80 | 6.06 |
| 4 | medium | 6.01 | 66.60 | 5.56 |
| 5 | medium | 5.63 | 100.00 | 6.08 |
| 6 | medium | 5.95 | 61.80 | 4.71 |
| 7 | low | 6.14 | 29.20 | 7.82 |
| 8 | medium | 6.71 | 81.60 | 2.68 |
| 9 | high | 5.69 | 96.00 | 1.79 |
| 10 | high | 5.40 | 100.00 | 1.32 |
| 11 | low | 5.59 | 76.50 | 7.96 |
| 12 | high | 6.21 | 97.40 | 2.12 |

TABLE 2(c)

(Twelve sample rows from the Boston Housing data set (Part 3 of 3).)

| ROW | HWYACCES | TAX_RATE | CLASSIZE | %LOWINCM |
| --- | --- | --- | --- | --- |
| 1 | 1 | 296 | 15.30 | 4.98 |
| 2 | 2 | 242 | 17.80 | 9.14 |
| 3 | 3 | 222 | 18.70 | 2.94 |
| 4 | 5 | 311 | 15.20 | 12.43 |
| 5 | 5 | 311 | 15.20 | 29.93 |
| 6 | 4 | 307 | 21.00 | 8.26 |
| 7 | 8 | 284 | 19.70 | 6.86 |

TABLE 2(c)-continued (Twelve sample rows from the Boston Housing data set (Part 3 of 3).)

| ROW | HWYACCES | TAX_RATE | CLASSIZE | %LOWINCM |
|---|---|---|---|---|
| 8 | 6 | 432 | 17.80 | 10.16 |
| 9 | 4 | 437 | 21.20 | 17.19 |
| 10 | 5 | 403 | 14.70 | 26.82 |
| 11 | 7 | 330 | 19.10 | 12.50 |
| 12 | 24 | 666 | 20.20 | 17.60 |

Harrison and Rubinfield collected and analyzed these data to determine whether air pollution had any effect on house values within the greater Boston area. One approach to addressing this question is to build a model that predicts house price as a function of air pollution and other factors that could potentially affect house prices.

FIG. 1 shows a decision tree 100 generated from the Boston Housing data using the CART algorithm (L. Breiman, J. H. Friedman, R. A. Olshen, and C. J. Stone, *Classification and Regression Trees*, New York: Chapman & Hall, 1984) as implemented in STATISTICA for Windows (*STATISTICA for Windows [Computerprogram manual]*, Version 5.5, 1995, StatSoft, Inc., 2300. East 14th Street, Tulsa, Okla., 74104-4442). The STATISTICA program was told to construct a decision tree model that predicts PRICE (i.e., the median value of owner-occupied homes broken down into high, medium, and low ranges) using all of the other columns in the data table as potential inputs to the model (i.e., as explanatory data fields).

Each node 1 through 13 in the tree shown in FIG. 1 corresponds to a data segment (i.e., a subset of the data). Illustrated at each node are histograms of the proportions of high-, medium-, and low-priced neighborhoods that belong to the corresponding data segments. The price range that corresponds to each histogram bar is indicated by legend 14. Each node in FIG. 1 is also labeled with the dominant price range within the corresponding segment (i.e., the price range that has the largest histogram bar). Thus, for node 1, the dominant price range is medium, whereas for nodes 2 and 3 the dominant price ranges are high and low, respectively.

Tree branches correspond to tests on the values of the inputs to the predictive model and it is these tests that define the data segments that correspond to each node in the tree. For example, in FIG. 1, node 1 is the root of the tree and it corresponds to the entire set of data. Test 15 (i.e., % LOWINCM$\leq$14.4) defines the data segments that correspond to nodes 2 and 3.

Left-going branches in FIG. 1 are followed when the outcome of the corresponding test is "yes" or "true." Right-going branches are followed when the outcome of the test is "no" or "false." Thus, node 2 corresponds to the subset of data for which % LOWINCM is less than or equal to 14.4, and node 3 corresponds to the subset of data for which % LOWINCM is greater than 14.4. Similarly, node 4 corresponds to the subset of data for which % LOWINCM is less than or equal to 14.4 and AVGNUMRM is less than or equal to 6.527, and so on.

The leaves of the tree (i.e., nodes 4, 5, 7, 8, 10, 12, and 13) correspond to the subsets of data that are used to make predictions in the decision tree model. In this example, the predictions are the dominant price ranges at the leaves of the tree. Thus, at node 4 the prediction would be "medium," at node 5 it would be "high," at node 7 it would be "low," etc.

FIG. 1 demonstrates the ability of decision tree programs to automatically extract meaningful patterns from collections of data. As the tree model indicates, air pollution does have an effect on house prices, but only for neighborhoods that have a sufficiently large percentage of low-income housing (i.e., % LOWINCM>14.4). For all other neighborhoods, house prices are primarily affected by the size of the house, as indicated by the average number of rooms per house in the neighborhood (i.e, AVGNUMRM).

When air pollution is a factor, but the air pollution level is sufficiently small, then the next most predictive factors that affect house prices are crime rate, the percentage of non-retail industrial land, and the distance to a major center of employment, with the more desirable (i.e., higher-priced) neighborhoods being those with low crime rates (i.e., node 8) and those with sufficiently large percentages of non-retail industrial land located away from centers of employment (i.e., node 13).

To demonstrate that decision tree algorithms are not application-specific, but can be applied to any application simply by providing application-specific data as input, the STATISTICA program was executed again, but this time it was told to predict the air pollution level (i.e., NOXLEVEL) using all of the other data columns as explanatory variables, including PRICE. FIG. 2 shows the resulting tree model 200. As this tree illustrates, the majority of neighborhoods that have the highest levels of air pollution (i.e., node 28) are those with sufficiently large percentages of non-retail industrial land, sufficiently large percentages of older buildings, and sufficiently high tax rates.

Not surprisingly, these factors characterize downtown Boston and its immediate vicinity. The majority of neighborhoods that have the lowest levels of air pollution (i.e., node 26) are those with sufficiently small percentages of non-retail industrial land, sufficiently large percentages of houses on large lots, and that are sufficiently far from centers of employment. These characteristics are typical of outlying suburbs. The majority of neighborhoods that have moderate levels of air pollution (i.e., node 29) are those with sufficiently small percentages of non-retail industrial land, sufficiently small percentages of houses on large lots, and easy access to radial highways that lead into Boston. These characteristics are typical of urban residential neighborhoods favored by commuters.

For both FIGS. 1 and 2, the relationships described above make intuitive sense, once the tree models are examined in detail. However, it is important to keep in mind that the STATISTICA program itself has no knowledge of these intuitions nor of the source of data. The program is merely analyzing the data to identify patterns that have predictive value.

Nevertheless, the program produces meaningful results. The decision tree models that are produced as output are useful, concrete, and tangible results that have specific meaning with respect to the input data and the user-specified modeling objectives (i.e., which data field to predict in terms of which other data fields). From a database perspective, the specification of the input data and the modeling objectives constitutes a query, and the decision tree model that is produced as output constitutes a query result.

The usefulness of decision tree algorithms, in particular, and automated predictive modeling technology, in general, derives from the fact that they can perform their analyses automatically without human intervention, and without being told what kinds of relationships to look for. All that they need to be told is which data values are to be predicted, and which data values can be used as inputs to make those predictions. The generic nature of such technology makes the technology extremely useful for the purpose of knowledge discovery in databases. Moreover, it is the generic nature of predictive modeling technology that permits the technology to be incorporated into general-purpose database systems.

Note that, once a decision tree has been constructed—or, for that matter, once any type of predictive model has been constructed—the step of applying that model to generate predictions for an intended application is conventional, obvious, and noninventive to those skilled in the art of predictive modeling.

Although decision tree methods yield models that can be interpreted and understood for the purposes of knowledge discovery, the predictive accuracy of decision tree models can be significantly lower than the predictive accuracies that can be obtained using other modeling methods. This lower accuracy stems from the fact that decision trees are piecewise-constant models; that is, within each data segment defined by the leaves of the tree, the predictions produced by the model are the same for all members of that segment.

FIG. 3 illustrates this effect 300 in the case of regression trees, which are decision trees used to predict numerical values instead of categorical values. As FIG. 3 indicates, the output 39 of a piecewise-constant model (such as one produced by conventional decision tree algorithms) is stair-like in nature and is therefore inherently inaccurate when used to model data 38 that exhibits smooth variations in values relative to the inputs of the model. The strength of decision tree models, however, is that they are quite good at modeling any nonlinearities that might exist, as FIG. 3A demonstrates.

To overcome the deficiencies of the piecewise-constant aspect of decision trees, Natarajan and Pednault have developed a method for constructing tree-based models with multivariate statistical models in the leaves—specifically, linear regression models and naive-Bayes models (R. Natarajan and E. P. D. Pednault, "Segmented Regression Estimators for Massive Data Sets," *Proceedings of the Second SIAM International Conference on Data Mining* (on CD-ROM), Arlington, Va., April 2002), the contents of which are hereby incorporated by reference.

This method is further described in the above-identified copending patent application. FIGS. 3B and 3C show how this segmented regression method works. In the initial model 301 shown in FIG. 3B, a first linear estimation 302 of the data is modeled. As shown in FIG. 3C, the linear model 301 is refined into a linear segmented model 303 by calculating linear estimates 304-307 for a number of segments. The number of segments and the segment boundaries are determined by applying a top-down process for building decision trees in which the tree branches define segment boundaries and the leaves of the decision trees contain linear regression models.

However, the above segmented regression method is limited by another deficiency of tree-based predictive modeling methods, which is that one quickly runs out of data as a result of dividing data into numerous subsets that correspond to the leaves of a tree. Less data implies greater estimation errors in the parameters of the leaf models, and these estimation errors can in turn lower the predictive accuracy of the resulting model relative to what could be achieved using other modeling techniques.

Thus, the problem remains in predictive modeling to provide an accurate model via a process that quickly converges, using limited amounts of data.

SUMMARY OF THE INVENTION

In view of the foregoing exemplary problems, drawbacks, and disadvantages of the conventional systems, it is an exemplary feature, aspect, and goal of the present invention to provide a structure (and method) in which convergence is accelerated and accuracy is enhanced in a stagewise method that also automatically models cross-product interactions.

It is another exemplary feature, aspect, and goal of the present invention to provide techniques to prevent overfitting of the stagewise method.

It is another exemplary feature, aspect, and goal of the present invention to provide various configurations of a stagewise method using stages having a feature transform stage and a linear transform stage.

It is another exemplary feature, aspect, and goal of the present invention to provide various generalized configurations of a stagewise method that incorporates cross-product interactions.

To achieve the above and other exemplary features, aspects, and goals, in a first exemplary aspect of the present invention, described herein is a predictive model method, including receiving an input data into an initial model to develop an initial model output and receiving both of the input data and the initial model output as input data into a first transform/regression stage.

In a second exemplary aspect of the present invention, also described herein is predictive modeling method (and apparatus and signal-bearing medium tangibly embodying a program of machine-readable instructions executable by a digital processing apparatus), including establishing an initial model module to instance an initial model and establishing a stage model module to instance a stage model for each of a plurality of successive stages, wherein each instanced stage model receives, as an input, an output from a preceding stage model, and each instanced stage model provides a stage model output that is used as an input into a next successive instanced stage model, if any.

In a third exemplary aspect of the present invention, also described herein is a method of providing a service, including at least one of providing an execution of a predictive modeling method as described above, providing an input data into the described predictive modeling method; and receiving a result of the described predictive modeling method.

In a fourth exemplary aspect of the present invention, also described herein is a predictive modeling method, including using an initial model that provides an initial model of input data and using at least one successive stage model, each successive stage model providing a cross-product interaction model.

In a fifth exemplary aspect of the present invention, also described herein is a method of determining performance degradation in an iterative predictive modeling, including dividing an available data into a training set and a holdout data set, using the training set to estimate a model parameter and to construct alternative model structures, and using the holdout data set to make a selection among the alternative model structures.

In a sixth exemplary aspect of the present invention, also described herein is a method of determining performance degradation in an iterative predictive modeling, including dividing an available data into a plurality of folds of data, successively, using each fold as a holdout data set, and a remaining data not in the fold is used as a training data set, to estimate model parameters and to construct alternative model structures and the training data set is used to make a selection among said alternative model structures.

BRIEF DESCRIPTION OF THE DRAWINGS

The foregoing and other exemplary features, aspects and advantages will be better understood from the following detailed description of exemplary embodiments of the invention with reference to the drawings, in which:

FIG. 2 shows the decision tree result 200 when the conventional computer tool was executed a second time, as instructed to predict the air pollution level (i.e., NOX-LEVEL), using all of the other data columns as explanatory variables, including PRICE;

FIG. 15 illustrates an exemplary hardware/information handling system 1500 for incorporating the present invention therein;

FIG. 16 illustrates a signal bearing medium 1600 (e.g., storage medium) for storing steps of a program of a method according to the present invention; and FIG. 17 illustrates a block diagram 1700 of an exemplary software structure for implementing the present invention.

DETAILED DESCRIPTION OF EXEMPLARY EMBODIMENTS OF THE INVENTION

Figure 1:
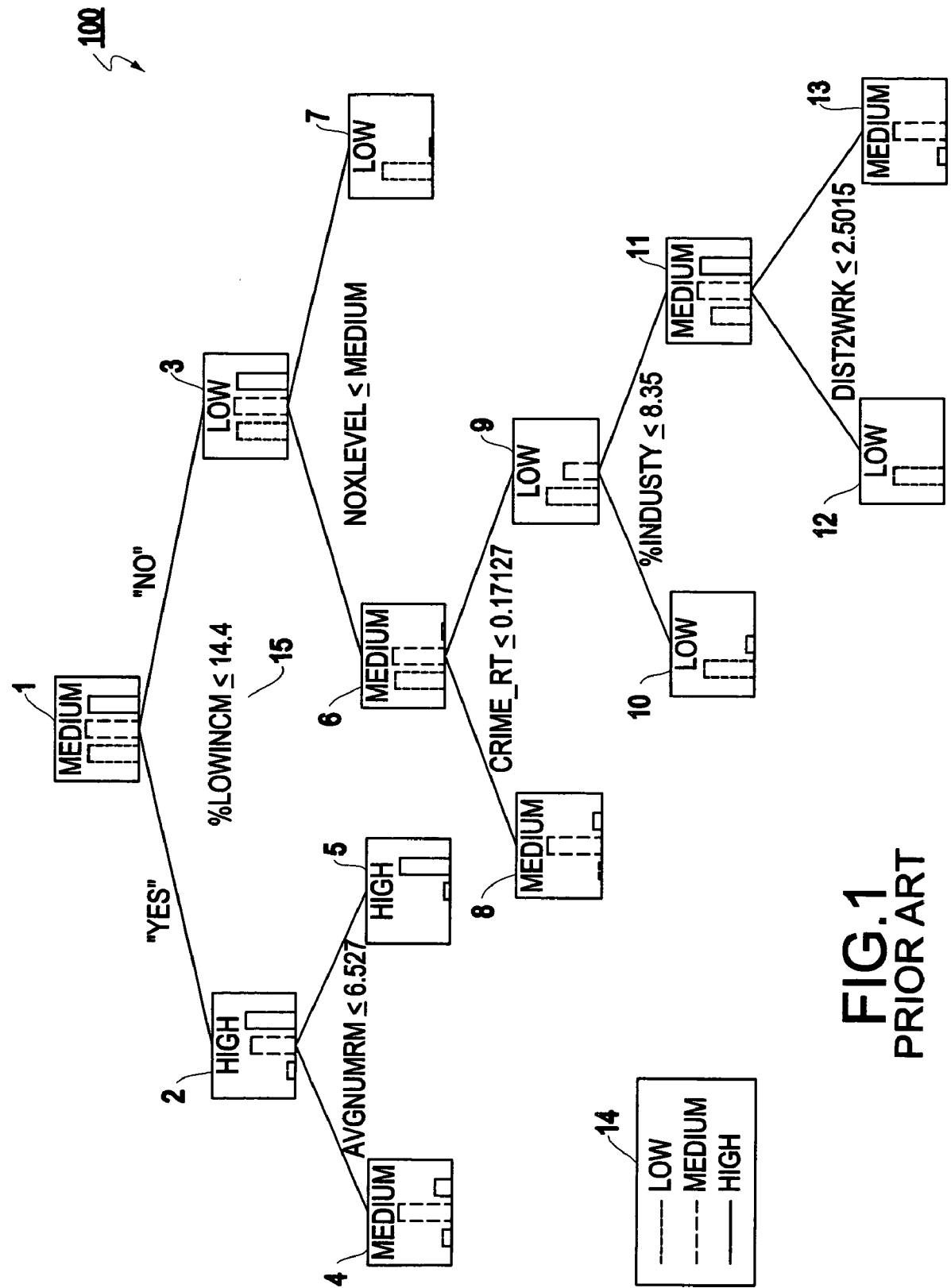
FIG. 1 shows a decision tree result 100 generated from the Boston Housing data using a conventional computer tool instructed to predict price, using all of the other columns in the data table as potential inputs to the model.
Figure 3A:
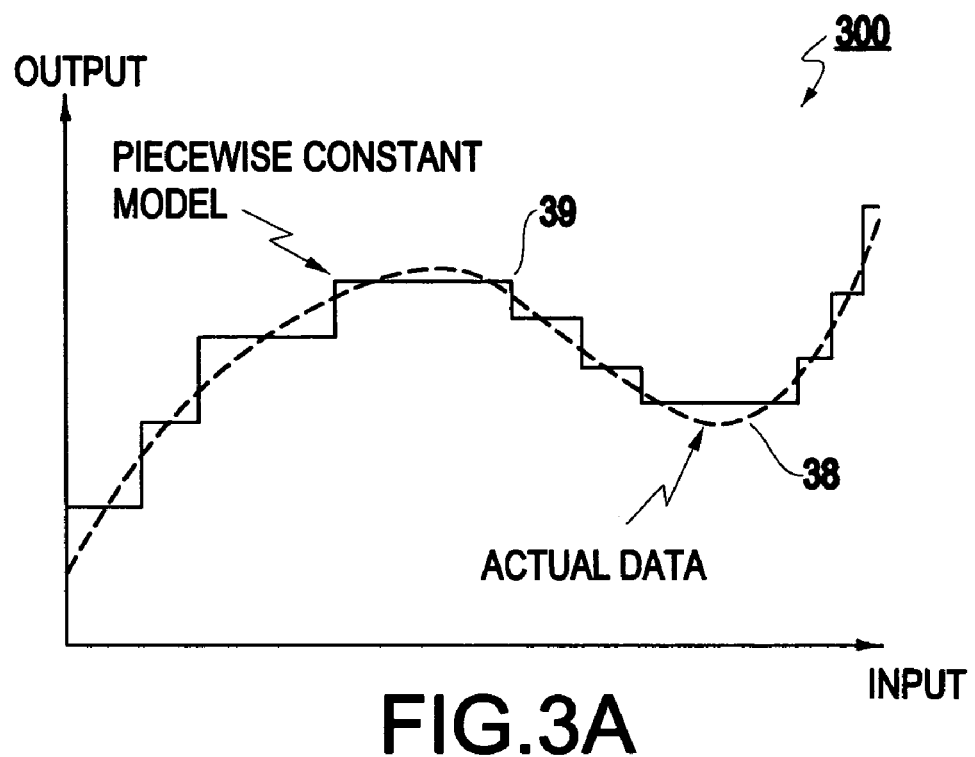
FIG. 3A illustrates the stair-like effect 300 of a piecewise-constant in the case of regression trees.
Figure 3B:
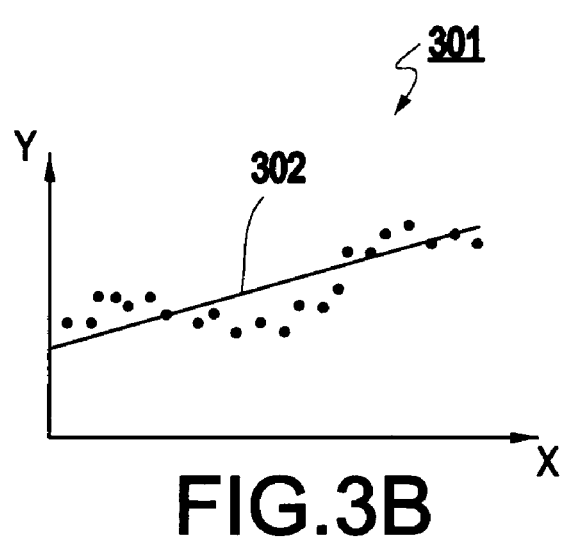
FIGS. 3B and 3C shows how a simple linear model 301 evolves into a segmented linear model 303.
Figure 3C:
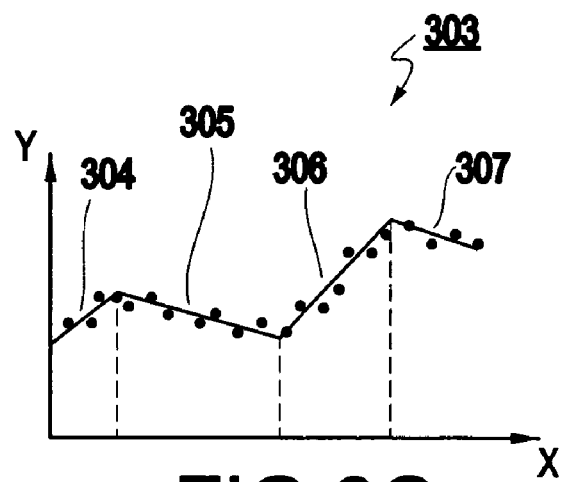

Referring now to the drawings, and more particularly to FIGS. 4-17, exemplary embodiments of the method and structures according to the present invention are shown.

Figure 4:
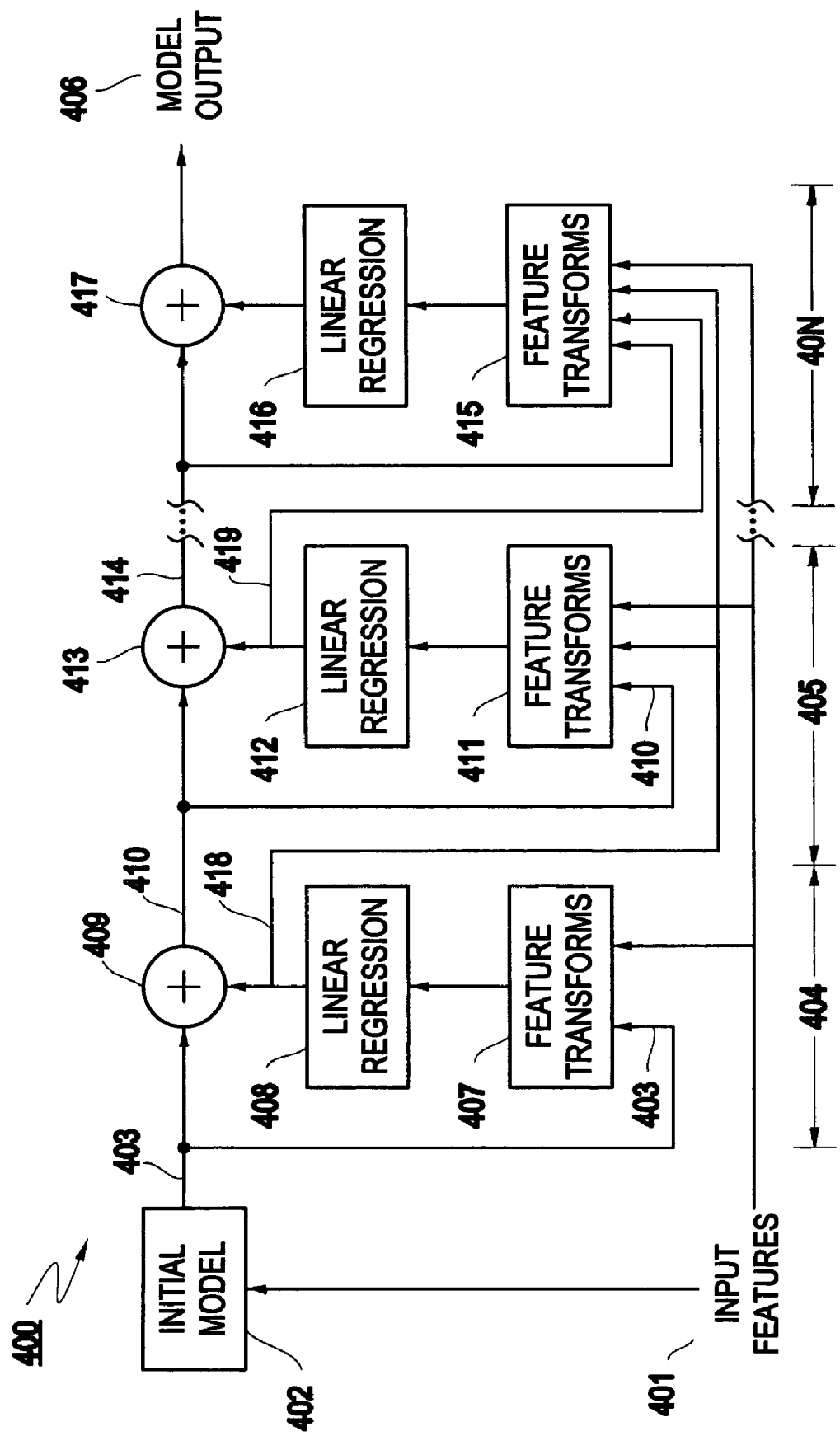
FIG. 4 illustrates exemplary embodiments 400 of the present invention.

The exemplary embodiment shown in FIG. 4 provides an entirely new predictive modeling technique 400 that combines stagewise gradient boosting with tree-based nonlinear feature transformation, followed by linear regression of transformed features. By allowing the outputs of each stage to be used as feature inputs to subsequent stages, the method also incorporated tree-based nonlinear transformation of regression outputs. The term "transform regression" is used to refer to the method illustrated in FIG. 4 of combining feature transformations with linear regression.

In the context of the present invention, "gradient boosting" means the method of Jerome H. Friedman (J. H. Friedman, (2002) "Stochastic gradient boosting," Computational Statistics and Data Analysis, 38(4):367-378, 2002, preprint: http://www-stat.stanford.edu/~jhf/ftp/stobst.ps; J. H. Friedman (2001). "Greedy Function Approximation: A Gradient Boosting Machine," Annals of Statistics 29(5): 1189-1232, preprint: http://www-stat.stanford.edu/~jhf/ftp/trebst.ps) for improving the predictive accuracy of an initial model via a stagewise process of additively combining the output of the initial model with the outputs of additional models that are successively constructed in a stagewise manner in order to incrementally correct the prediction errors of the initial model and preceding constructed stages.

"Feature transformation" means a non-linear transformation of an explanatory input feature or an output of a preceding stage in a gradient boosting model, The term is meant to also include transformations that possibly combine the feature or gradient-boosting-stage output that is being transformed with other features and/or gradient-boosting-stage outputs. In the exemplary embodiment shown in FIG. 4, feature transformations are carried out using the bottom-up tree-based segmented regression process of Natarajan and Pednault (see R. Natarajan and E. P. D. Pednault, "Segmented Regression Estimators for Massive Data Sets," cited above, as well as the above-mentioned copending patent application).

When applying this segmented regression process, the feature or gradient-boosting-stage output that is being transformed is used to define the segments. In addition, other features and/or gradient-boosting-stage outputs may be included in the linear regression models that appear in the leaves of the resulting trees in order to combine them. The advantage of this method of combining features and/or gradient-boosting-stage outputs is that it has the effect of modeling cross-product interactions among features and/or gradient-boosting-stage outputs without having to explicitly incorporate cross-product terms in the various regression equations of the resulting predictive models.

"Linear regression" means any of a variety of statistical linear-regression methods, including stepwise linear regression in which only a subset of available input features are actually included in the resulting regression equations, and including ridge regression and other forms of regularized linear regression in which bias of one form or another is introduced in the calculation of regression coefficients in order to prevent overfitting.

In this exemplary modeling technique 400, the input features 401 are fed into an initial model 402. The output 403 of this initial model 402 becomes an input into the next stage 404. Additional stages 405 through 40N provide stagewise improvements until output 406 is provided. Each stage 404, 405, . . . 40N further comprises a feature transform module 407, 411, 415, a linear regression module 408, 412, 416, and a summing junction 409, 413, 417 to respectively provide stage outputs 410, 414, 406.

In comparison to conventional methods described earlier, the present method 400 is similar to Friedman's stagewise gradient boosting method in that the outputs of successive stages are added via summing junctions to provide a final output. However, the present method 400 is distinguished from Friedman's method in that the output of a preceding stage becomes one of the inputs into a succeeding stage.

More specifically, the output 403 of the initial model 402 becomes an input into first stage 404. Output 410 of first stage 404 becomes an input into second stage 405, and this stagewise input to succeeding stages continues through final stage 40N.

The advantage of using outputs of each stage as inputs to subsequent stages is that convergence is speeded up by making successive stages mutually orthogonal. An additional advantage is that this use of the stage outputs enables cross-product interactions to be modeled without explicitly introducing cross-product terms in the model. A third advantage is that doing so can reduce or eliminate systematic errors between the final model output and the target field that is to be predicted.

In a second exemplary embodiment, also illustrated by FIG. 4, the outputs 418, 419 of the linear regression modules 408, 412 of preceding stages 404, 405 are fed forward to succeeding stages. The advantage of this second feedforward is that it can further speed up convergence by making the output of each stage mutually orthogonal to all preceding stages and not merely mutually orthogonal to the immediately preceding stage.

Input features 401 may be provided from a database in which the inputs are strictly historical data, or these inputs may include dynamically-updated input data.

In general, FIG. 4 shows the exemplary embodiments discussed above, using transform regression as the modeling method for each stage. The initial model 402 could be any technique to derive a basic model, even a technique as simple as determining a mean for each section of the input features.

The first iteration 404 could be any current transform regression algorithm. For example, univariate linear regression tree (LRT) models would be constructed for each input data field in order to produce linearized derived features, and stepwise regression would be performed on the linearized derived features in order to obtain the overall model 404 for the first iteration. The objective of both the feature transforms 407 and the linear regression module 408 is to predict the residuals of the initial model; that is, the difference between the target field that is to be predicted and the output 403 of the initial model 402. The output 418 of the linear regression module 408 will thus be a correction that is added to the output 403 of the initial stage in order to provide an improved prediction 410.

The second iteration 405 would be almost identical to the first iteration, except that a form of Gram-Schmidt orthogonalization would be used to construct derived features that are orthogonal to the model constructed in the first iteration 404. As with standard Gram-Schmidt orthogonalization, the output 410 of the first stage would be subtracted from the value of the target field. An objective of the second iteration is, therefore, to predict the residuals of the first stage.

Another aspect of Gram-Schmidt orthogonalization is to construct a new set of derived features that are orthogonal to the output of the first stage (i.e., the dot products between the output 410 of the first stage and each new derived feature in module 411 should be zero). To accomplish this feat, all that needs to be done is to include the output of the first stage as a regression variable in the linear regression trees for each feature when constructing transformed features 411.

The resulting linear regression trees would no longer be univariate, they would be bivariate. Moreover, the models in each leaf node would be individually orthogonalized with respect to the first stage, so that the overall transformations defined by each tree would likewise be orthogonal to the first stage. Stepwise regression would next be performed on the derived features in order to obtain a linear regression module 412 that predicts the residuals of the first stage. The output 414 of the second stage would then be the sum of the output 403 of the initial model and the residual prediction outputs 418 and 419 of the first and second stages. The resulting new set of orthogonal transformed features 411 will (by construction) provide new information not captured in the first stage.

Each subsequent iteration would be similar to the second. The outputs of the preceding stages would be subtracted from the target field to compute residuals, and the outputs of these stages would likewise be introduced as regression variables in the linear regression trees that are constructed for each feature in order to produce new sets of linearized transformed features for predicting these residuals. The overall model 406 would be the sum of the initial model and the stage models constructed at each iteration.

It should be noted that including the outputs of stage model as regression variables in the linear regression trees that are constructed for each input field also has the effect of implicitly modeling certain forms of cross-product feature interactions. In particular, cross-product interactions that might exist between the input field that is being transformed and the outputs of stage models are directly modeled in a piecewise-linear fashion. Moreover, in so doing, cross-product interactions among input fields are indirectly modeled in as much as the outputs of stage models are also functionally dependent on the all input fields that have thus far entered into the model.

Figure 5:
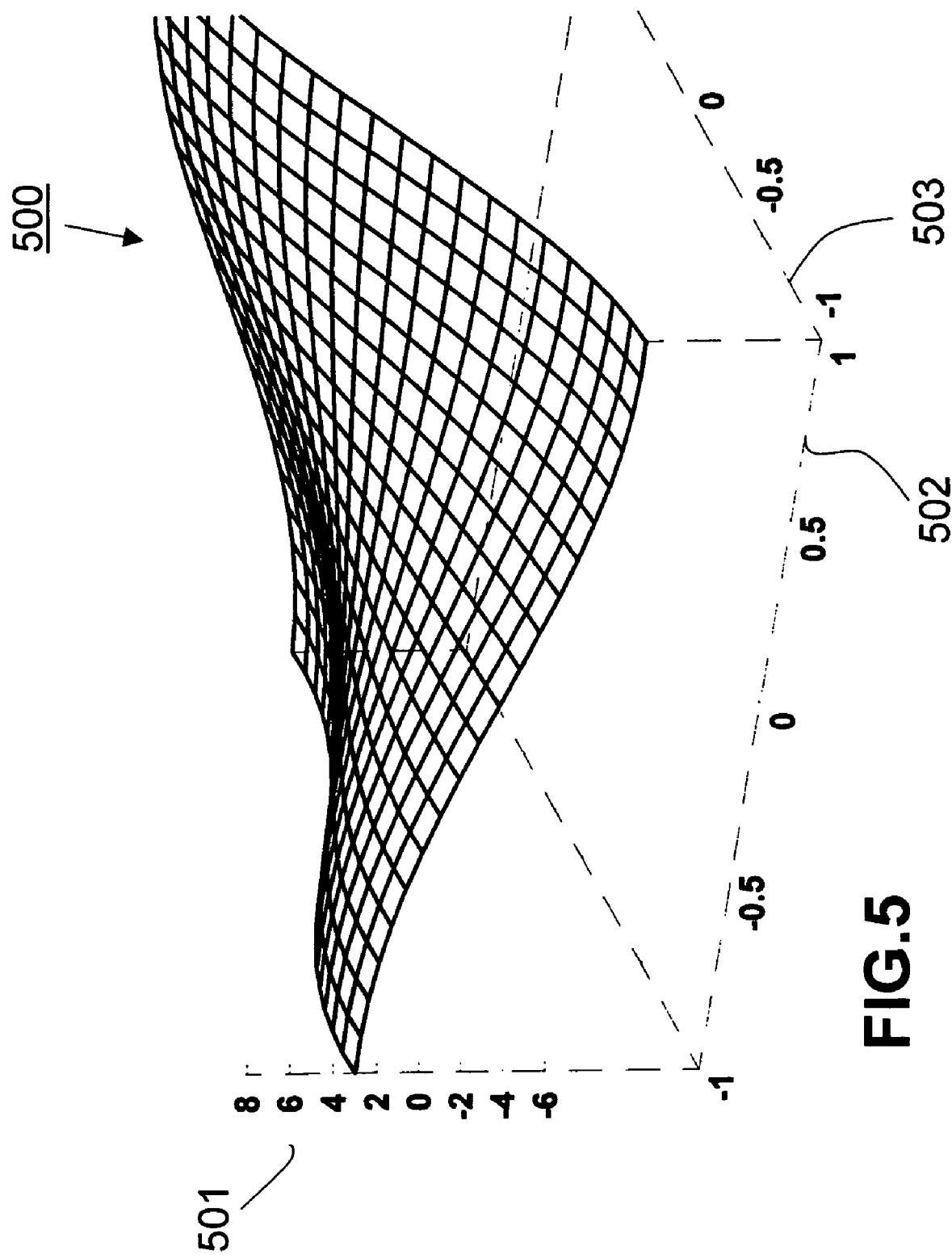
FIG. 5 shows an exemplary target function 500 to be modeled in transform regression, in order to demonstrate the effect of cross product interactions between the two input fields represented by the horizontal axes.

This phenomenon of indirect modeling of cross-product feature interactions is illustrated in FIGS. 5-11. FIG. 5 illustrates a target function to be modeled that contains a strong cross-product interaction between the two input fields represented by the horizontal axes. The function in this case is:

$$z=5 \cdot \sin(x \cdot \pi/2) \cdot \sin(y \cdot \pi/2)+x+y,$$

where z corresponds the vertical axis in FIG. 5, and where x and y correspond to the two horizontal axes. Because the above function is symmetric about x and y, the exact labeling of these two axes is essentially arbitrary. If one were to apply the method described above starting with an initial model that simply predicts zero (i.e., the simplest possible initial model), then FIG. 5 also illustrates the residuals of the initial model.

Figure 6:
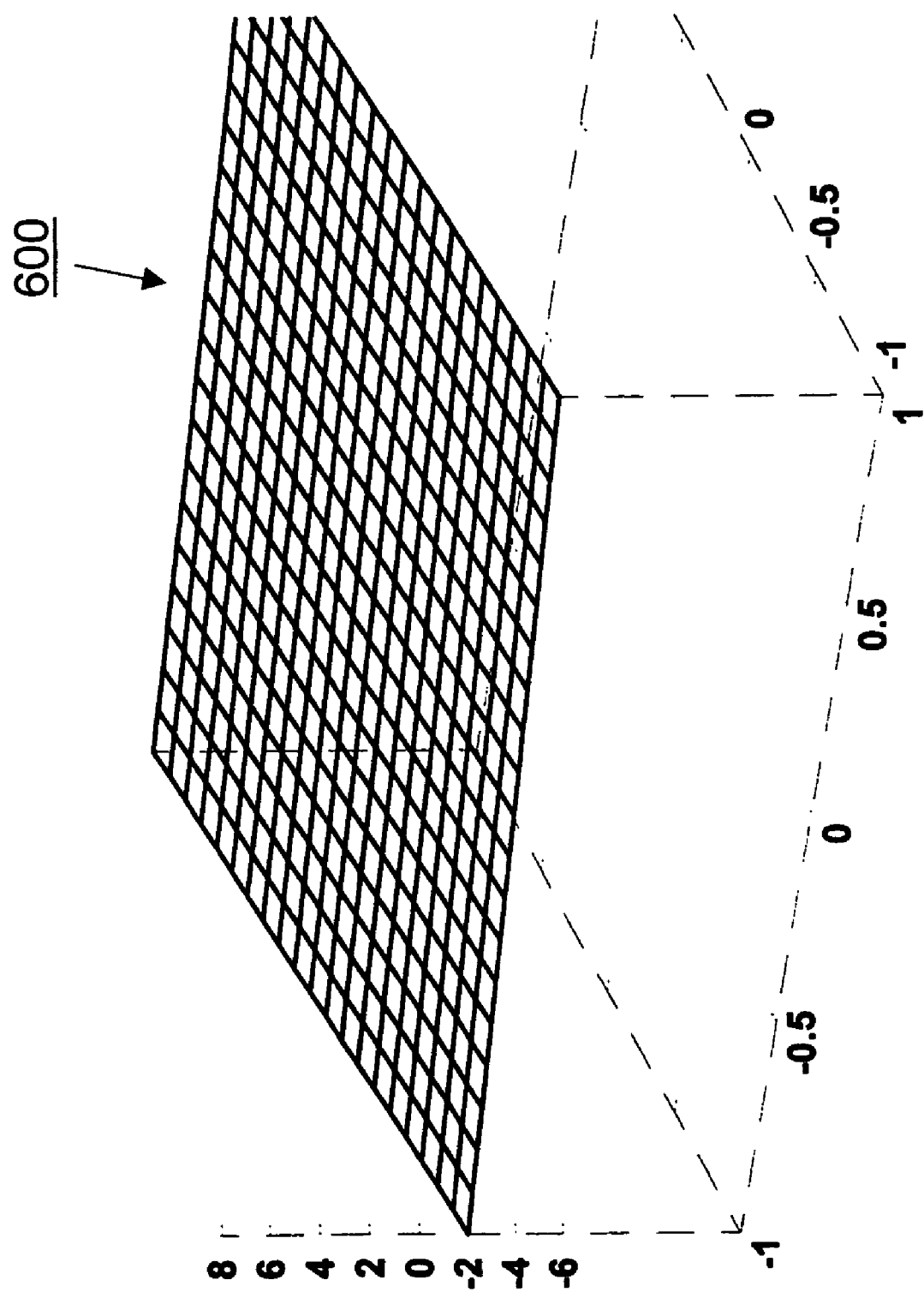
FIG. 6 shows the output 600 of the first stage of transform regression, using inputs representing the target function 500.
Figure 7:
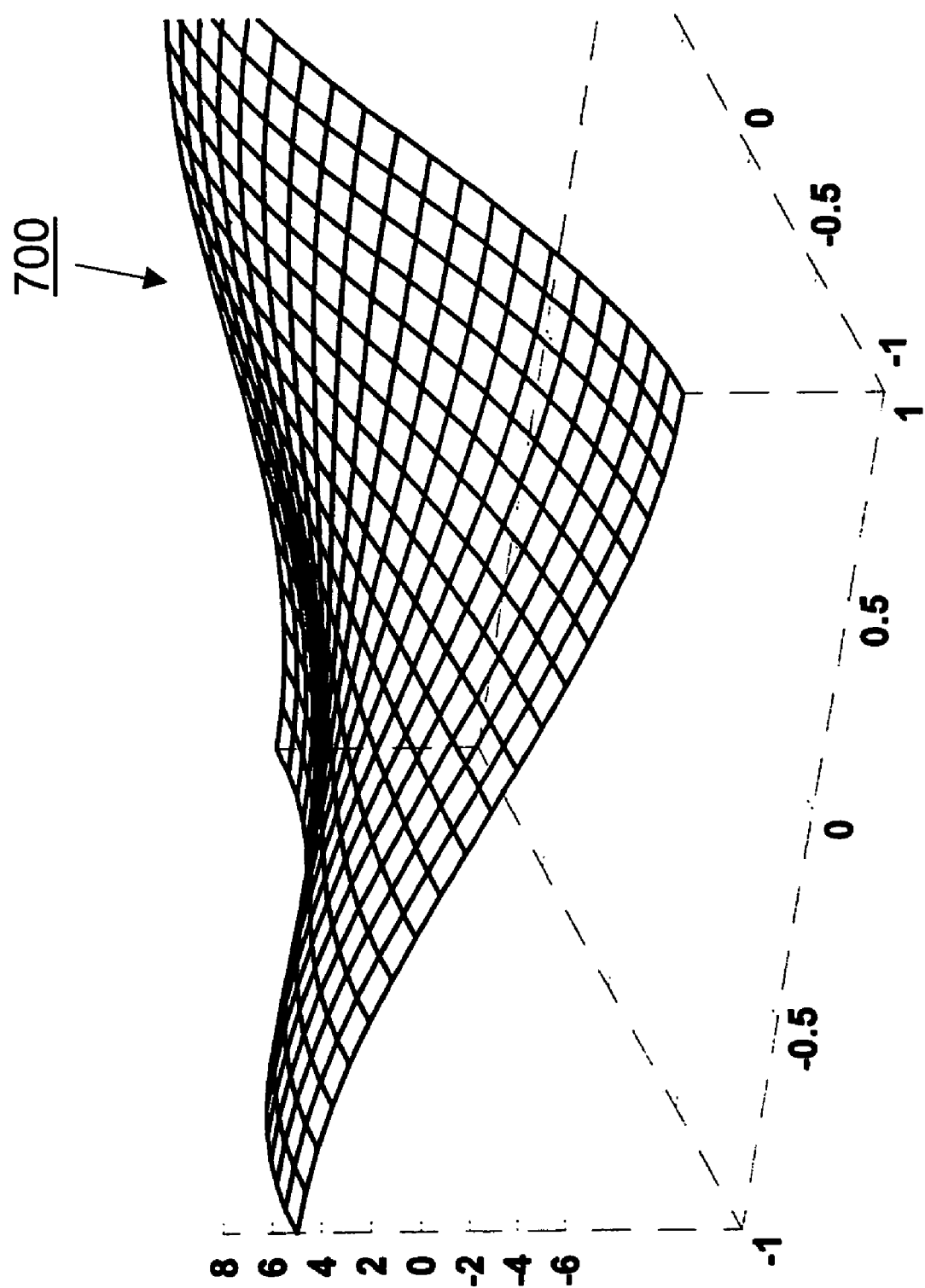
FIG. 7 shows the residuals 700 of the first stage with the target function 500 example.

FIG. 6 illustrates the output of the first stage of transform regression (i.e., after constructing feature transformations, performing stepwise linear regression, and adding the result to the output of the initial model). As FIG. 6 demonstrates, only the (x+y) term in the equation for z is modeled by the first stage of transform regression. The $\sin(x \cdot \pi/2) \sin(y \cdot \pi/2)$ term is not modeled because, as is well-known mathematics, such cross-product interaction terms cannot be expressed as a linear combination of separate non-linear transformations of x and y. The fact that this interaction term is not modeled by the first stage of transform regression becomes clearly evident when one examines the residuals of the first stage, which are illustrated in FIG. 7.

The goal of the second stage of transform regression is to predict the residuals of the first stage. However, in the second stage, the output of the first stage can be used both as an input feature and as a regression variable in the linear regression trees that are constructed in the feature transformation process. As discussed above, doing so enables cross-product interaction to be implicitly modeled without having to explicitly introduce cross-product terms in the regression equations that comprise the model. This phenomenon is clearly evident in the output of the second stage, which is illustrated in FIG. 8.

Figure 8:
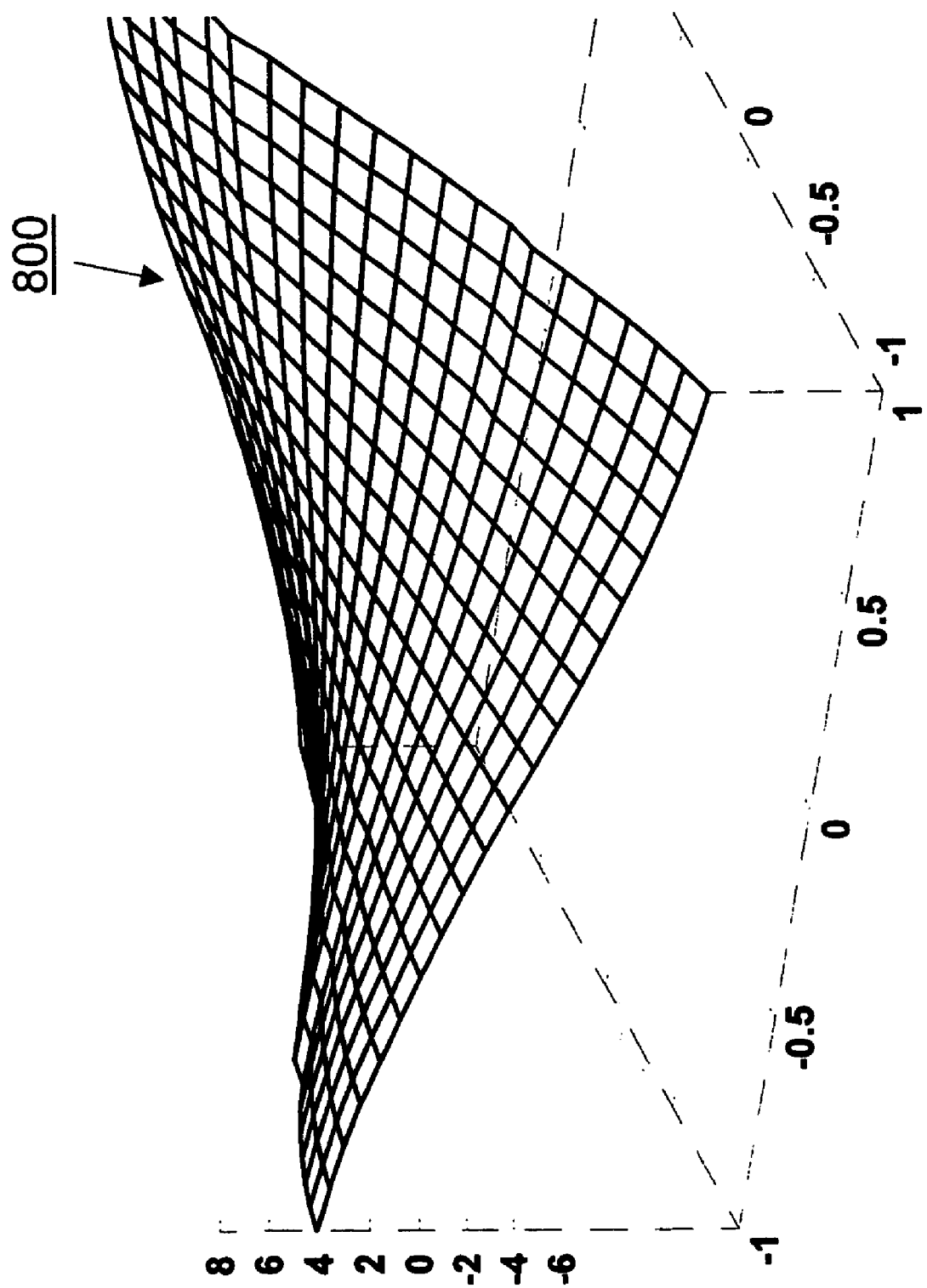
FIG. 8 shows the output 800 of the second stage with the target function 500 example.
Figure 9:
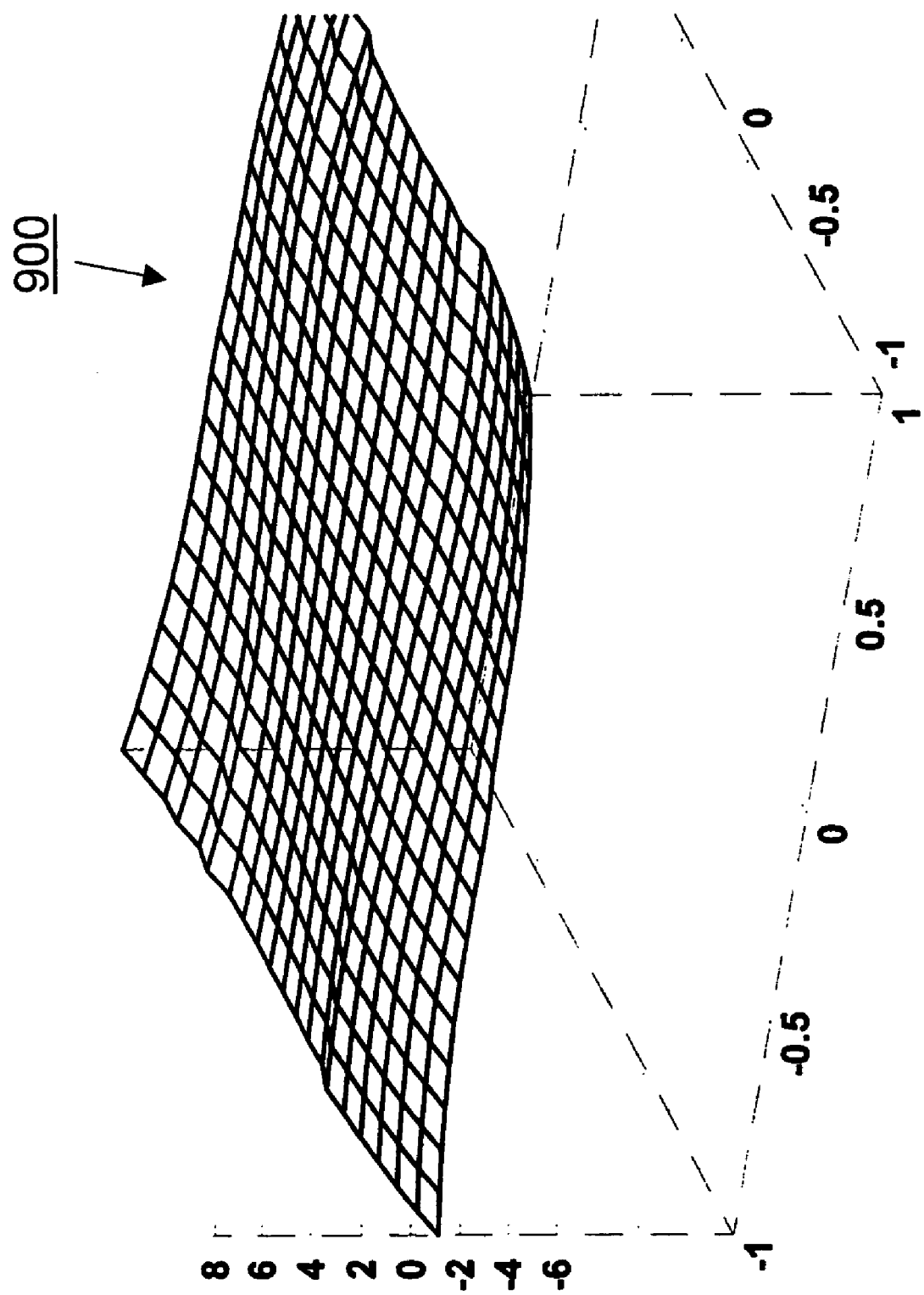
FIG. 9 shows the residuals 900 of the second stage with the target function 500 example.

As FIG. 8 demonstrates, the second stage of transform regression successfully models the basic structure of the sin(x·π/2) sin(y·π/2) interaction term. However, the output still contains prediction errors, as is evident from the residuals of the second stage that are shown in FIG. 9. As FIG. 9 illustrates, the central portions of the target function are now reasonably well approximated; however, the extreme corners still exhibit significant residual error.

Figure 10:
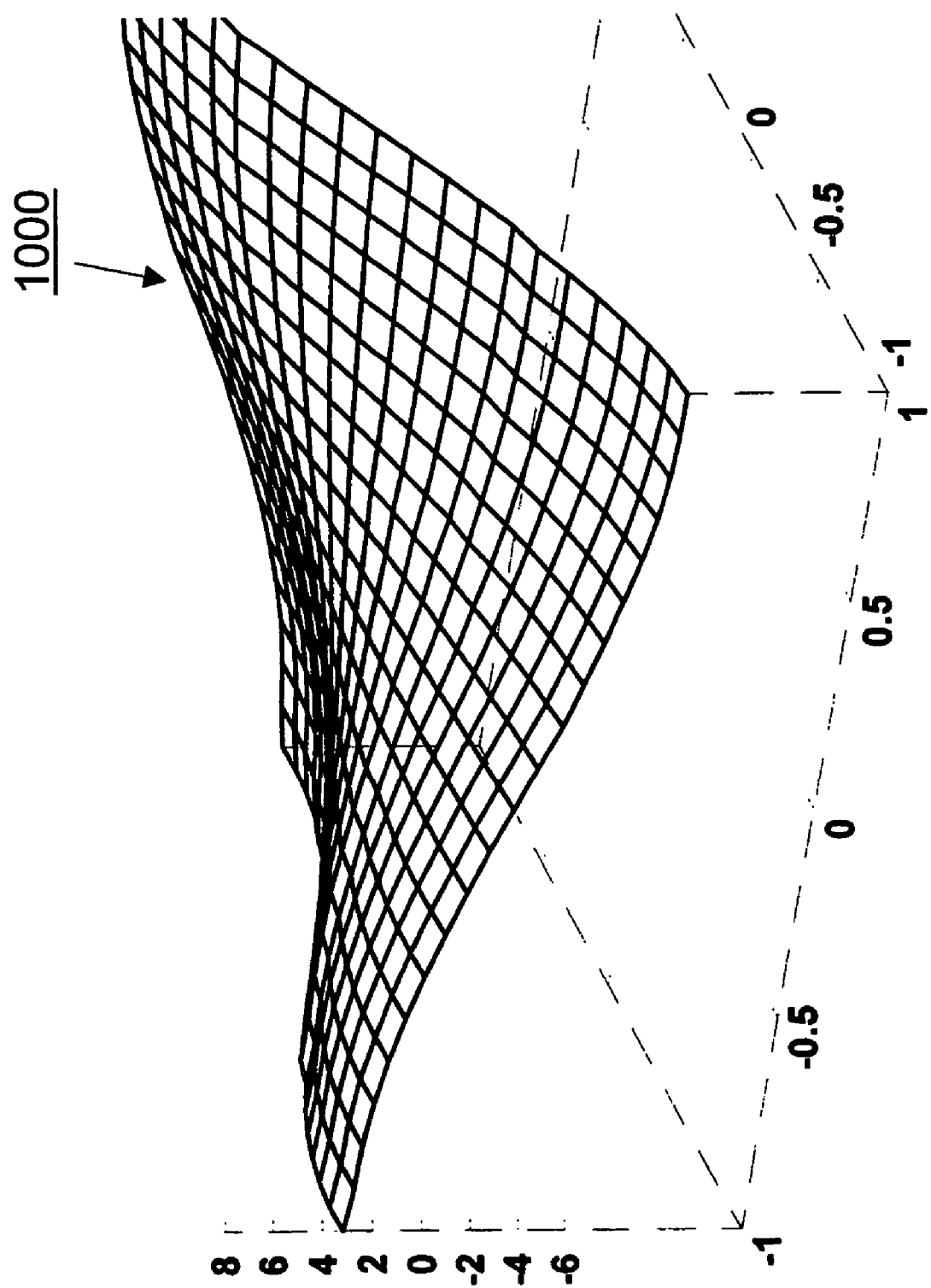
FIG. 10 shows the output 1000 of the third stage with the target function 500 example.
Figure 11:
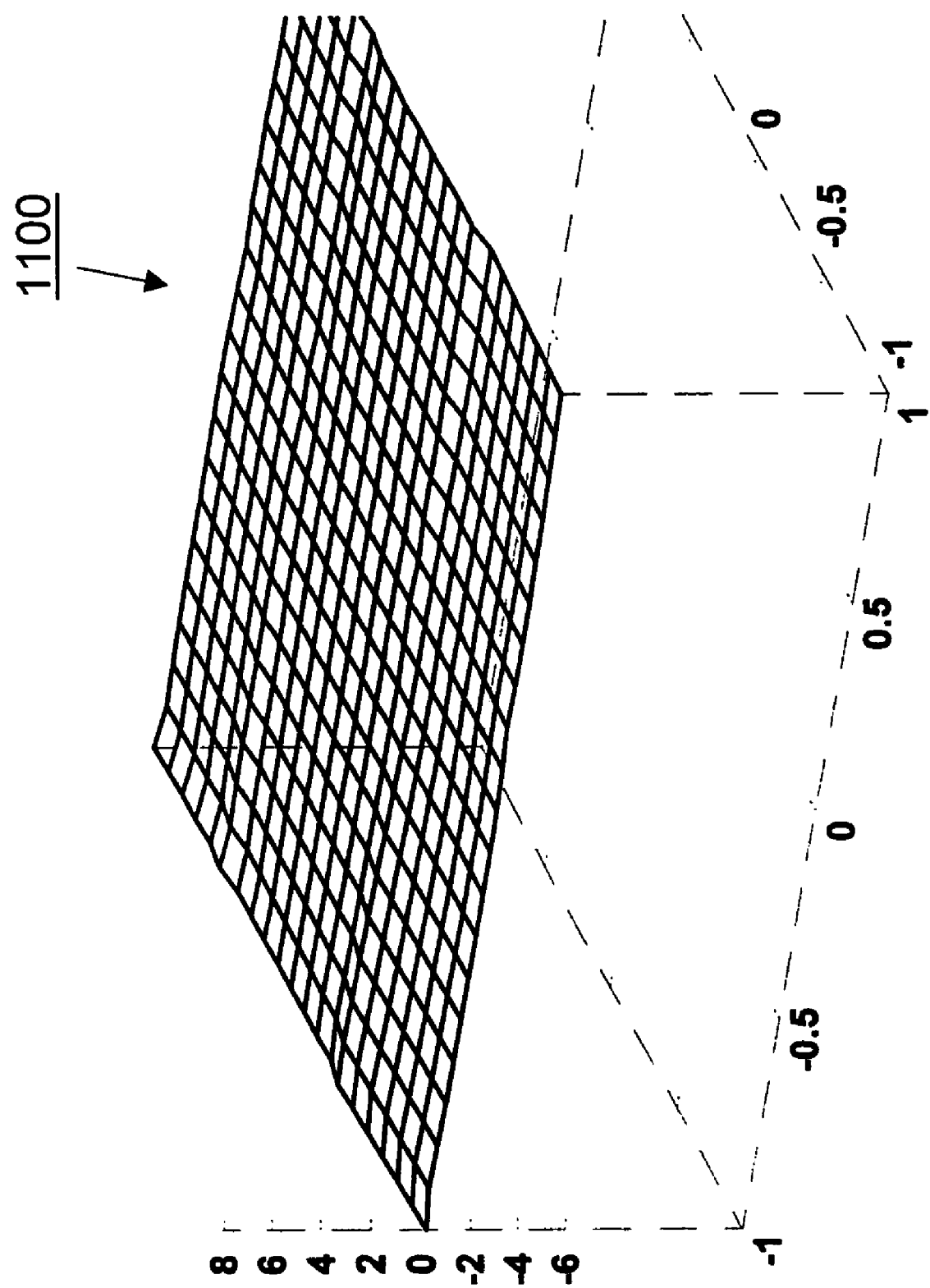
FIG. 11 shows the residual error 1100 of the third stage with the target function 500 example.

A third iteration of transform regression removes the majority of the remaining residual error, as can be seen from FIGS. 10 and 111 which illustrate, respectively, the output of the third stage (FIG. 10) and the residual error of the third stage (FIG. 11). At this point in the process, further iteration provides only minor improvement.

In many respects, the ability of the invention to model cross-product interactions is quite remarkable in that no cross-product interaction terms appear in any of the regression equations from which the resulting model is comprised. A theoretical explanation as to why transform regression works surprisingly well is based on Kolmogorov's superposition theorem published in 1957:

For any continuous function $f(x_1, \ldots, x_n)$ on an n-dimensional hypercube, there exist unary functions $g_i(x)$ and $h_{i,k}(x_k)$; $i=0, \ldots, 2n$; $k=1, \ldots, n$; such that $$f(x_1, \ldots, x_n) = \sum_{i=0}^{2n} g_i\left(\sum_{k=0}^{n} h_{i,k}(x_k)\right)$$

The $h_{i,k}$ functions correspond to input feature transformations. The $g_i$ functions correspond to nonlinear transformations of the outputs of linear regression modules of each transform regression stage (i.e., the stage outputs that feed into the summing junctions).

In the second exemplary embodiment described above, the $g_i$ functions are implicitly introduced by using the outputs linear regression modules of preceding stages as inputs to succeeding stages, wherein transformed features (i.e., $g_i$ functions) are then constructed from these linear regression module outputs.

The primary role of the $g_i$ functions in Kolmogorov's theorem is to handle arbitrary cross-product interactions among input variables so that any continuous function can be represented. Modeling of cross-product interactions is achieved by the $g_i$ functions because nonlinearly transforming a sum implicitly produces cross-products among terms in that sum.

In the first exemplary embodiment described above, cross-product interactions are modeled by allowing the outputs of preceding transform regression stages to appear as additional inputs to the $h_{i,k}$ functions that correspond to the feature transforms. In the second exemplary embodiment, the $g_i$ functions, which are introduced by using the outputs linear regression modules of preceding stages as inputs to succeeding stages, provide additional cross-product modeling capabilities. With the $g_i$ functions added, Kolmogorov's theorem implies that piecewise linear approximations of any continuous function could potentially be represented using the second exemplary embodiment.

Note, however, that the transform regression process itself is a greedy hill-climbing algorithm. Therefore, it is quite likely that there are target functions that the algorithm will not model well, even if a good model might in fact be representable in transform regression formalism. By its very nature, a greedy hill-climbing algorithm does not perform an exhaustive search and is not always able to find an initial optimum.

On the other hand, the algorithm has thus far worked very well in all of our tests, which indicates that the greedy hill-climbing approach of transform regression works well in practice on real-world problems.

It is interesting to note that Kolmogorov's superposition theorem is also used by some members of the neural net community to justify neural nets as a general-purpose modeling tool. In particular, Kolmogorov's theorem implies that any continuous function on a hypercube can be represented as a three-layer neural net, where the $g_i$ and $h_{i,k}$ functions are used as the activation functions of the first two layers. This observation was made by Hecht-Nielsen in 1987.

However, in practice, activation functions of neural nets are held fixed and only weights can be adjusted during training. Hence, Kolmogorov's theorem does not provide much in the way of theoretical support for neural nets because fixing the activation functions highly constrains the corresponding $g_i$ and $h_{i,k}$ functions for the kinds of neural nets that are actually constructed for real-world applications.

In the case of transform regression, on the other hand, Kolmogorov's theorem does provide at least a rudimentary theoretical basis because the process directly attempts to construct suitable $g_i$ and $h_{i,k}$ functions.

Holdout Data and Cross Validation

A second aspect of the present invention addresses the number of stages of gradient boosting, thereby addressing the concern for overfitting. In general, overfitting destroys the predictability of a model and must be avoided. Overfitting occurs when the best model relative to the training data tends to perform significantly worse when applied to new data. This mathematically corresponds to a situation in which the estimated predictive performance as measured on the training data substantially overestimates the true predictive performance that could be theoretically determined if the true underlying statistical model were already known.

Although there is always some probability that overestimation of predictive accuracy will occur for a fixed model, both the probability and the degree of overestimation are increased by the fact that there is an explicit search for models that optimize predictive performance on training data. This search biases the difference between measured accuracy and true accuracy toward the maximum difference among competing models. If the maximum difference does not converge to zero as the number of data records increases, then overfitting will occur with probability one.

Two common methods for avoiding overfitting in predictive modeling both use separate validation data in order to obtain less-biased estimates of true predictive accuracy. The simpler of these methods is to divide available data into a training data set and a holdout data set. The training data set is used to estimate model parameters and to construct alternative model structures (e.g., to create prioritized lists of which input features to include in stepwise regression models, or to construct branching conditions in tree-based models, etc.). The holdout data set is then used to make selections among these alternative model structures.

For example, in the case of stepwise regression models, in which alternative model structures are defined by prioritized lists of which input features to include in the model, the selection is accomplished by first estimating model performance on the holdout data set for each different cutoff point in a prioritized list of input features. The subset of features that maximizes predictive performance on the holdout data is then selected. In the case of tree-based models, model performance is first measured on the holdout data for different alternative prunings of a tree. The pruned subtree that maximizes predictive performance on the holdout data is then selected.

A second method for avoiding overfitting is analogous to the holdout method, except in this case available data is divided into a plurality of "folds," instead of simply a training set and a holdout set. In this "cross-validation" method, each fold is effectively treated as a distinct holdout set and all data not in that fold is effectively treated as a corresponding training set for that fold. In cross validation, the process described above (e.g., of using training data to estimate model parameters and to construct alternative model structures, and of using holdout data to evaluate the predictive performance of alternative model structures) is then applied with respect to each and every fold, and the holdout accuracies across folds are aggregated into a single predictive accuracy score that is used to select a best alternative model structure.

Thus, cross validation attempts to make maximum use of data by reusing the holdout data that constitutes one fold as training data for all other folds. The cross validation method, however, imposes greater computational demand than the holdout method.

When applying either the holdout method or the cross-validation method, it is also common practice to re-estimate model parameters on all available data once a model structure has been selected. Re-estimation is performed in order to maximize predictive performance on future data by obtaining more accurate model parameter estimates.

In the case of transform regression, the holdout method and the cross-validation method can both be applied to prevent overfitting in the feature transform modules and the linear regression modules of transform regression. These methods can likewise be used to control the number of stages that are constructed by continuing to add stages until the holdout predictive performance becomes worst, or until a newly-added stage is added that always outputs a constant value (i.e., its output does not depend on the values of any of its inputs). In both instances, the most recently added stage can be dropped and the model-construction process can be terminated.

In many cases, the practice of re-estimating model parameters on all available data can be successfully applied within each feature-transform and linear-regression module once alternative model structures have been selected within these modules. However, in some cases, this practice can lead to overfitting because the predictive models in each of these modules will have had their parameters calculated using portions of data that are being used for holdout evaluation. As a consequence, overestimation biases are introduced in holdout accuracy measurements for all subsequent modules.

A second aspect of the present invention avoids this potential to overfit by eliminating the re-estimation of model parameters on all available data from the primary model-building process, and instead performing the re-estimation as part of a secondary process that in disconnected from and does not influence the primary process.

Figure 12:
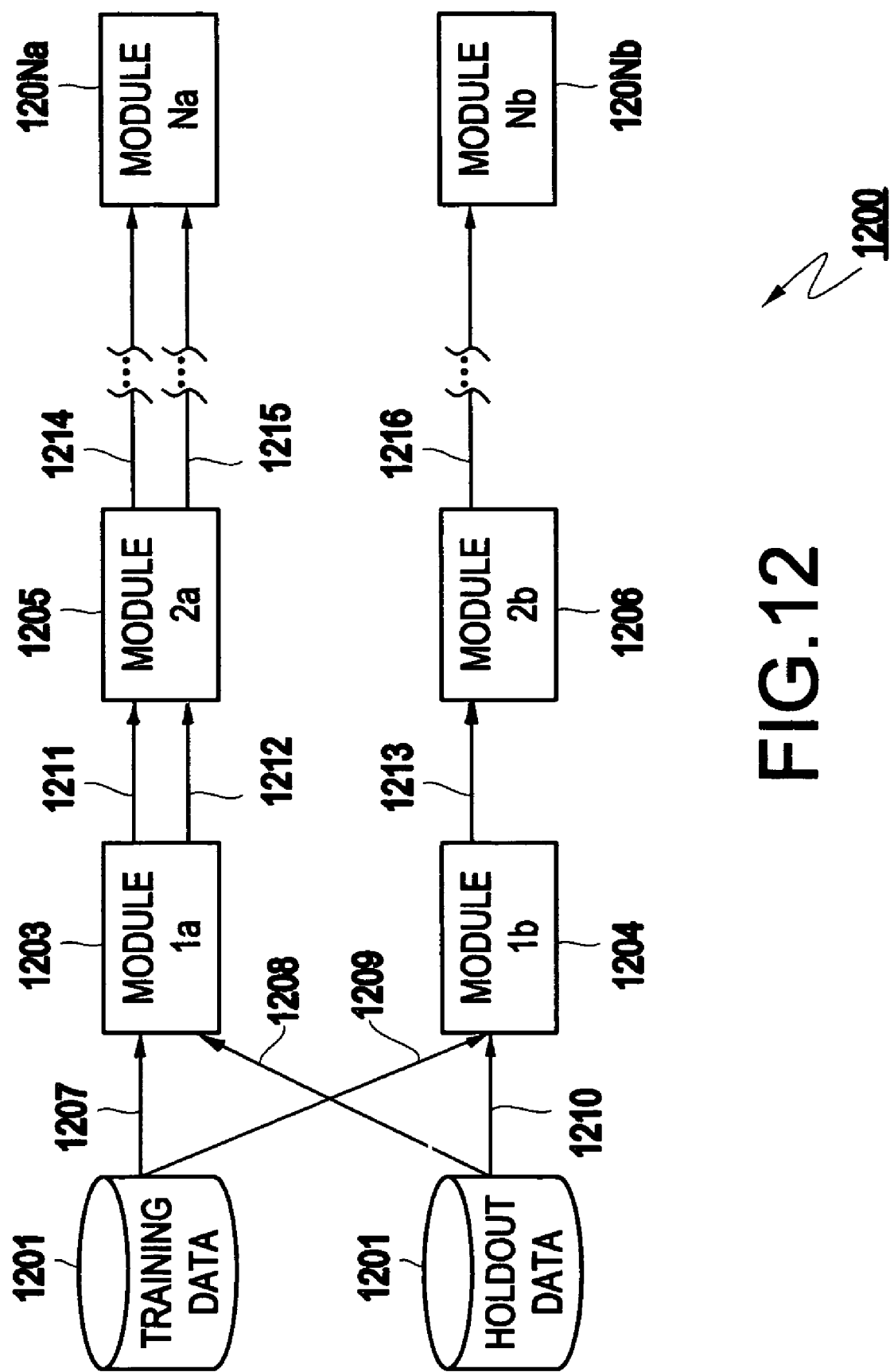
FIG. 12 shows an exemplary embodiment 1200 of the second aspect of the present invention for overfitting.

FIG. 12 illustrates an exemplary embodiment 1200 of the above second aspect of the present invention for the case in which the holdout method is used to prevent overfitting. In this embodiment 1200, the primary model-building process comprises a sequence of modeling stages represented by modules 1203, 1205, and 120Na.

In the primary model-building process, training data 1201 is provided 1207 as training input to a first predictive modeling module 1203. This first predictive modeling module 1203 could be, for example, the first feature transformation module 403 in a transform regression process 400. However, the process illustrated in FIG. 12 is fully general and can be utilized in any stagewise predictive modeling process to prevent overfitting in each successive stage.

In addition to training data, holdout data 1202 is provided 1208 as holdout input to the first predictive modeling module 1203. The first predictive modeling module 1203 uses the training data that is provided to estimate model parameters and to construct alternative model structures in the manner described above. It also uses the holdout data that is provided to evaluate the predictive performance of alternative model structures and to select the most predictive of these alternatives. However, the first predictive modeling module 1203 does not re-estimate model parameters on the combined training and holdout data as is often done in conventional holdout methods.

Once the first predictive modeling module 1203 is fully trained, training data 1201 together the outputs of the first predictive model 1203 applied to the training data are provided 1211 as training input to a second predictive modeling module 1205. Similarly, holdout data 1202 together the outputs of the first predictive model 1203 applied to the holdout data are provided 1212 as holdout input to this second predictive modeling module 1205.

As with the first predictive modeling module, the second predictive modeling module 1205 uses the training data that is provided to estimate model parameters and to construct alternative model structures in the manner described above. It uses the holdout data that is provided to evaluate the predictive performance of alternative model structures and to select the most predictive model structure, and it does not re-estimate model parameters on the combined training and holdout data.

The above process is then repeated for each subsequent modeling stage in the primary modeling process until a last predictive modeling module 120Na is fully trained. Note that because none of the predictive modeling modules in the primary process use the holdout data for model parameter estimation, the holdout data remains relatively unbiased in each successive modeling stage so as to minimize the likelihood of overfitting in each successive stage.

In order to use all of the data to re-estimate model parameters, a secondary modeling process is performed. The secondary model-building process comprises a separate sequence of modeling stages represented by modules 1204, 1206, and 120Nb. The model structures that were selected in the corresponding modules of the primary model-building process are transferred to the modules in the secondary process in order to re-estimate the model parameters on the combined training and holdout data.

Once the first predictive modeling module 1203 in the primary process is fully trained, its selected model structure is transferred to a duplicate first predictive modeling module 1204 in the secondary process. Training data 1201 and holdout data 1202 are then both provided 1209, 1210 as training input to this duplicate first predictive modeling module 1204 in order to re-estimate model parameters on the combined data. Similarly, once the second predictive modeling module 1205 in the primary process is fully trained, its selected model structure is transferred to a duplicate second predictive modeling module 1206 in the secondary process.

Training data 1201 and holdout data 1202, together the outputs of the duplicate first predictive modeling module 1204 applied to these data, are then provided 1213 as training input to the duplicate second predictive modeling module 1206 in order to re-estimate model parameters on the combined data. This process is repeated for each successive modeling stage in the primary modeling process until the model parameters of a duplicate last predictive modeling module 120Nb in the secondary process have been re-estimate on the combined training and holdout data.

Figure 13:
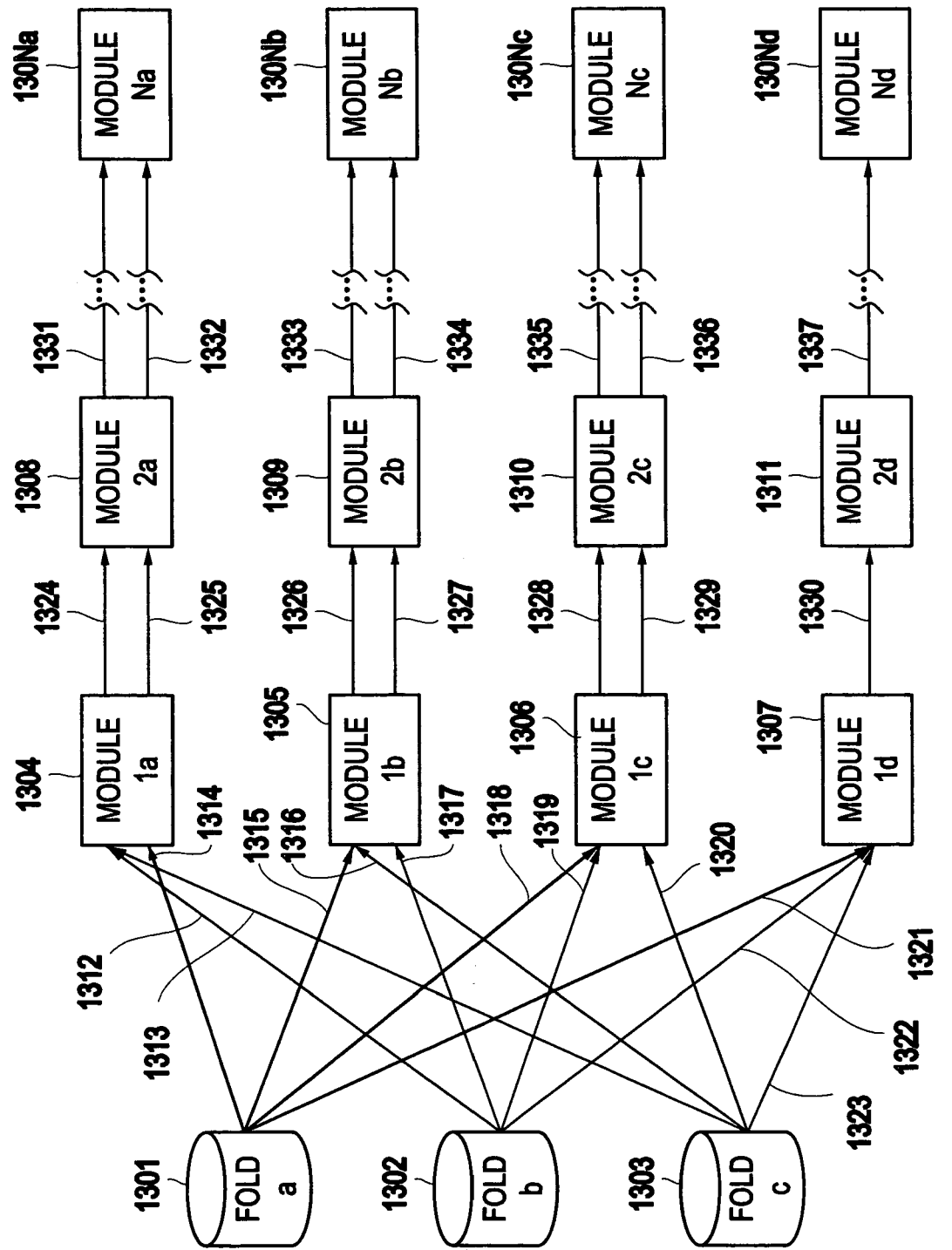
FIG. 13 shows an exemplary embodiment 1300 of the second aspect of the present invention for the case in which cross-validation is used to prevent overfitting.

FIG. 13 illustrates an exemplary embodiment 1300 of the above second aspect of the present invention for the case in which cross-validation is used to prevent overfitting. In this embodiment 1300, the primary model-building process comprises parallel sequences of modeling stages, one sequence of stages for each fold of cross validation. FIG. 13 illustrates an exemplary embodiment for the case in which threefold cross validation is employed. The available data is thus partitioned into three folds 1301, 1302, and 1303. The first fold 1301 is used as holdout data in a sequence of modules 1304, 1308, 130Na dedicated to the first fold in the primary model-building process, while the other folds 1302, 1303 are used as training data for this sequence of modules.

Similarly, the second fold 1302 is used as holdout data in a sequence of modules 1305, 1309, 130Nb dedicated to the second fold in the primary model-building process, while the other folds 1301, 1303 are used as training data for this sequence of modules. The third fold 1303 is used as holdout data in a sequence of modules 1306, 1310, 130Nc dedicated to the third fold in the primary model-building process, while the other folds 1301, 1302 are used as training data for this sequence of modules. In addition, all three folds 1301, 1302, 1303 are used as training data in a sequence of modules 1307, 1311, 130Nd in the secondary process whose purpose is to re-estimate model parameters on the combined data.

The primary model-building process for the cross validation method proceeds in much the same manner as for the holdout method, except that corresponding modules in each parallel sequence of modules must be constrained to produce the same sets of alternative model structures. The respective model parameters for each alternative model structure, however, can and will differ across the parallel sequences of modules for each fold. In addition, the same alternative model structure must be selected across corresponding modules in each parallel sequence of modules. As discussed above, model structures are selected when using cross validation based on the aggregated holdout evaluations of the alternative model structures for each fold. The above constraints ensure that a consistent set of alternative model structures will be constructed for selection, and that selected model structures can be transferred to the corresponding modules in the secondary model-building process.

In particular, with respect to FIG. 13, modules 1304, 1305, and 1306 in the primary model-building process must be constrained to produce the same sets of alternative model structures so that the selected model structure can be transferred to module 1307 in the secondary process. Similarly, modules 1308, 1309, and 1310 in the primary process must be constrained to produce the same sets of alternative model structures so that the selected model structure can be transferred to module 1311 in the secondary process, and modules 130Na, 130Nb, and 130Nc in the primary process must be constrained to produce the same sets of alternative model structures so that the selected model structure can be transferred to module 130Nc in the secondary process.

Other than the above model-structure constraints, the primary and secondary model-building processes are carried out in the same manner as for the holdout method.

From an implementation standpoint, it can be advantageous to implement corresponding modules in each parallel sequence of modules as subcomponents of super-modules that manage the modeling-building processes of parallel modules so that the model-structure constraints can be readily satisfied. When this is done, the exemplary process 1300 illustrated in FIG. 13 simplifies to process 1400 illustrated in FIG. 14. Folds 1401, 1402, and 1403 in FIG. 14 correspond respectively to folds 1301, 1302, and 1303 in FIG. 13. Super-module 1404 comprises modules 1304, 1305, 1306, and 1307 as subcomponents. Similarly, super-module 1405 comprises modules 1308, 1309, 1310, and 1311 as subcomponents, and super-module 140N comprises modules 130Na, 130Nb 130Nc, and 130Nd as subcomponents.

Figure 14:
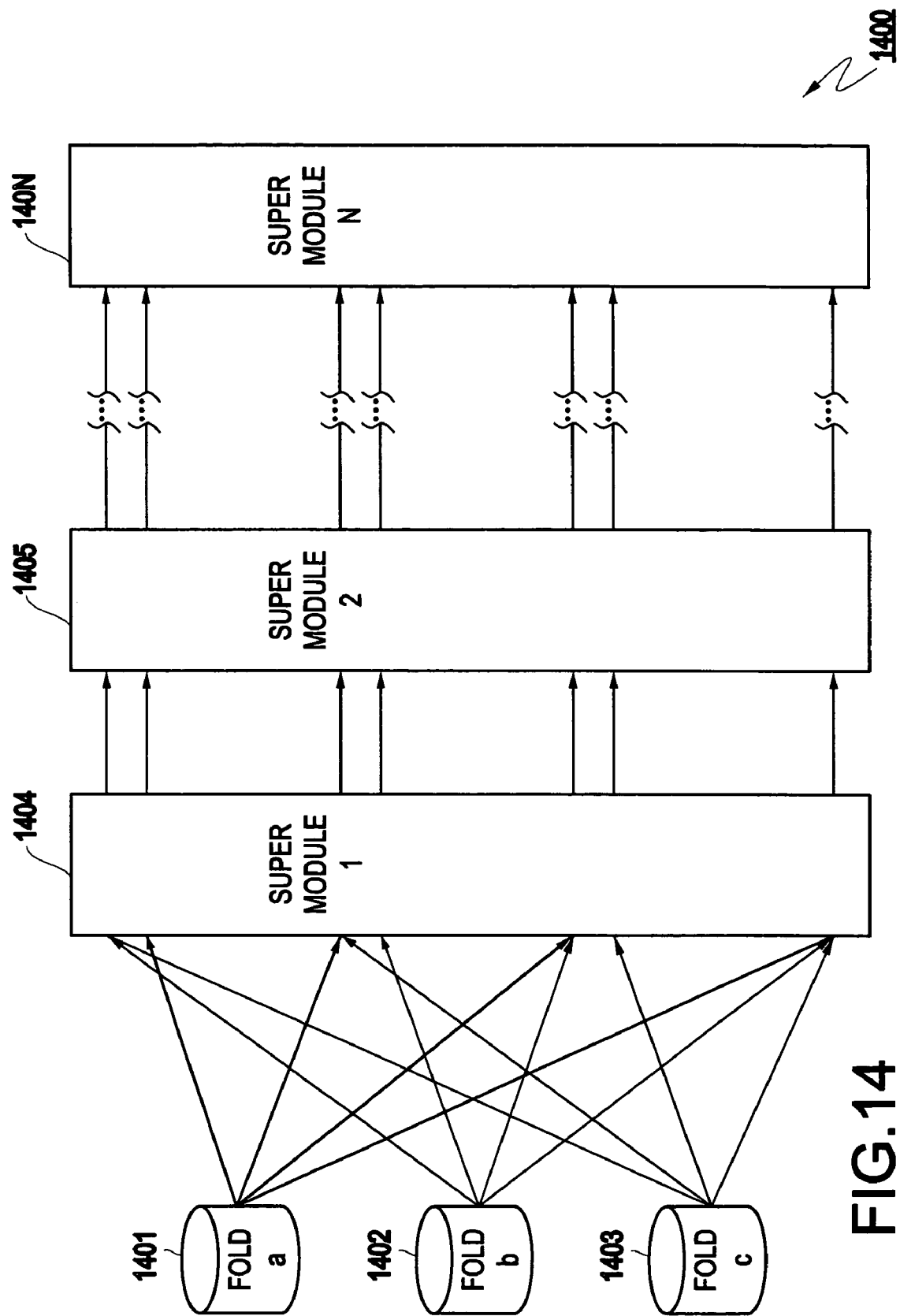
FIG. 14 shows an exemplary parallel structure implementation 1400 of the embodiment shown in FIG. 13.

The advantage of the organization illustrated in FIG. 14 is that it enables the parallel modeling processes for each fold to be easily managed. The resulting process organization also resembles that of conventional stagewise modeling processes. It is distinguished from conventional stagewise modeling processes, however, in that separate data paths are utilized for each fold of cross validation.

Note that the same process organization shown in FIG. 14 can likewise be used for the holdout method illustrated in FIG. 12. The only difference is that the number of subcomponents in each super-module is reduced (i.e., from four to two). The number of data paths would likewise be correspondingly reduced.

Also, note once again that the processes illustrated in FIGS. 12-14 for avoiding overfitting are fully general and can be utilized in any stagewise predictive modeling process to prevent overfitting in each successive stage.

Other Exemplary Embodiments

As discussed above, the method 400 illustrated in FIG. 4 is similar to Friedman's stagewise gradient boosting method in that the outputs of successive stages are added via summing junctions to provide a final output. In addition, the method 400 is distinguished from Friedman's method in that the output of a preceding stage becomes an input to a succeeding stage.

This feed-forwarding of stage outputs is perhaps the most important distinguishing characteristic of the present invention. In fact, if method 400 were modified so as to remove this feeding forward of stage outputs, the best approximation that could be obtained for the function illustrated in FIG. 5 would be the model output illustrated in FIG. 6, independent of how many additional iterations are performed beyond the first iteration. With feed-forwarding of stage outputs, the model output illustrated in FIG. 10 is obtained in three iterations. Thus, dramatic improvements in model quality can be obtained by combining Friedman's gradient boosting with the present invention's distinguishing aspect of feeding stage outputs forward as input to subsequent stages.

Moreover, just as Friedman's gradient boosting method can be practiced in conjunction with any predictive modeling technique for constructing stage models (i.e., "base learners" in Friedman's terminology), a generalized expression of the present invention could likewise employ any predictive modeling technique for constructing stage models. In other words, the method illustrated in FIG. 4 for constructing stage models (i.e., feature transformation followed by linear regression) could be replaced with any other desired modeling technique.

The resulting embodiment of the present invention would then reap the benefits of feed-forwarding of stage outputs, even if the method that is used to construct stage models is not be feature transformation followed by linear regression. For example, a depth-limited tree-based method could be used to construct stage models, as in Friedman's gradient tree-boost method, and the resulting embodiment would likewise benefit from the feed-forwarding of stage outputs.

Generalized expressions of the present invention can likewise incorporate other aspects of Friedman's gradient boosting method. For example, the method 400 illustrated in FIG. 4 uses simple subtraction to calculate residuals. Stage models are constructed to predict these residuals, and the stage model outputs are directly summed in order to produce a final prediction. This method of calculating residuals and summing stage outputs is likewise used in Friedman's gradient boosting method when squared error is used to assess model accuracy.

However, when other error measures (a.k.a., "loss functions" in Friedman's terminology) are used to assess model accuracy, Friedman's gradient boosting method calls for "pseudo-residuals" to be calculated whose values are calculated from the negative partial derivative of the desired error measure with respect to the output value of the model that has been constructed thus far. Stage models are then constructed to predict these pseudo-residuals.

In addition, the outputs of stage models are multiplied by scaling coefficients before summing the results to produce a final output. The values of these scaling coefficients are determined by searching for values that minimize the desired error measure. When the pseudo-residual method is employed to calculate residuals, scaling coefficients need to be introduced in order to maximize the contribution that each stage makes to the predictive accuracy of the overall model.

A generalized expression of the present invention can likewise combine feeding forward of stage outputs with the techniques of calculating pseudo-residuals and of multiplying stage model outputs by suitably selected scaling factors before the multiplied outputs are summed. As before, any "base learner" can be used to construct stage models, it need not be feature transformation followed by linear regression as illustrated in FIG. 4.

An advantage of such generalized expressions of the present invention is that the invention can be used to construct models that optimize any desired error measure. The present invention is thus not limited to constructing least-squares models.

Another variation of Friedman's method is stochastic gradient boosting, in which stages models are trained on randomly selected subsets of training data, and in which stage outputs are further multiplied by a "shrinkage" parameter before the results are summed to produce a final output. Training on randomly selected subsets of training data can help eliminate biases in gradient boosting algorithms and can prevent gradient boosting algorithms from being trapped in local minima in their search for an optimal model. The introduction of a shrinkage parameter enable many more stages to be constructed without overfitting. When combined, these two modifications to gradient boosting can improve overall model accuracy.

A generalized expression of the present invention can likewise combine feeding forward of stage outputs with the technique of training stages models on randomly selected subsets of training data, and/or the technique of further multiplying stage model outputs by a "shrinkage" parameter before the multiplied outputs are summed. Again, any "base learner" can be used to construct stage models. The learner is not restricted to feature transformation followed by linear regression as illustrated in FIG. 4.

An advantage of such generalized expressions of the present invention is that embodiments of the invention can then benefit from further increases predictive accuracy that can accompany stochastic gradient boosting techniques.

With respect to particularized expressions of the present invention in which feature transformation followed by linear regression is used as the "base learner" for constructing stage models, the use of multivariate linear regression trees to construct feature transformations is a further distinguishing aspect of the present invention because this technology enables the outputs of previous gradient boosting stages to be used as regressors in the regression equations that appear in the leaves of the regression trees. As discussed above, doing so has the effect of performing a Gram-Schmidt orthogonalization in that the resulting transformed features will then be orthogonal to the outputs of all preceding gradient boosting stages.

An advantage of this orthogonalization effect is that it enables the algorithm to converge faster in much the same way that conventional Gram-Schmidt orthogonalization enables conventional linear regression algorithms to converge faster.

Also as discussed above, a second advantage of this technique is that piecewise-linear approximations of cross-product interactions are constructed as a side effect. Although each such piecewise-linear approximation can individually be fairly crude when viewed in isolation, the cumulative effect of performing multiple such piecewise-linear approximations of cross-product interactions in several stages of a gradient boosting model can yield highly accurate overall approximations.

The above effect can be seen by examining FIGS. 5-10. The surface illustrated in FIG. 8 is a first piecewise-linear approximation to the cross-product interaction shown in FIG. 5. This approximation captures the main structure of the interaction, but it still contains a significant amount of residual error, as can be seen from the residuals shown in FIG. 9. The surface illustrated in FIG. 10 shows the cumulative effect of two successive piecewise-linear approximations to the cross-product interaction. At this point, the approximation is very good with small residual error, as can be seen from the residuals shown in FIG. 11.

From the point of view of the Kolmogorov superposition theorem discussed above, there should be no theoretical advantage to using the outputs of gradient boosting stages as regressors in the feature transformation trees in subsequent stages. As long stage outputs are fed forward and are used as inputs to subsequent stages and transformed features are constructed from these fed-forward stage outputs, the Kolmogorov superposition theorem says that the resulting functional form of the model is sufficiently general to allow any bounded continuous function to be represented, at least in principle.

Nevertheless, using the outputs of gradient boosting stages as regressors in the feature transformation trees in subsequent stages can contributed significantly to the predictive accuracies of models when the present invention is applied in practice. The feed-forwarding aspect of the present invention can thus be quite advantageous from a practical standpoint.

In a second embodiment of the feature transformation modules 407, 411, 415 shown in FIG. 4, all other input fields are included as potential regressors in all stepwise linear regressions that are performed in the leaves of the transformation trees that are constructed, in addition to the outputs of previous stages and the fields being transformed. Applying either the holdout or the cross-validation method described above will then select a subset of predictive regressors in each leaf without overfitting the training data.

This second embodiment of the feature transformation modules has the advantage of providing still faster convergence, and of potentially modeling an even wider range of cross-product interactions. However, this second embodiment does have a disadvantage in that it imposes a greater computational burden, both in terms of the memory requirements of the resulting process and the amount of additional computation that must be performed. This additional burden is not very large when the number of input fields is small.

However, the memory requirements grow cubically as a function of the number of input fields, and the amount of computation grows quartically. This second embodiment is therefore not suitable when the number of input fields is large. But for small numbers of input fields, this second embodiment can potentially be quite advantageous. Moreover, because this second embodiment attempts to directly model cross-product interactions, it can also be practiced without feed-forwarding of stage outputs and cross-product interactions will still be modeled, though possibly to a lesser extent in some cases.

A third embodiment of the feature transformation modules 407, 411, 415 shown in FIG. 4, all fields in a pre-designated subset input fields are included as potential regressors in all stepwise linear regressions that are performed in the leaves of the transformation trees that are constructed, in addition to the outputs of previous stages and the fields being transformed. Applying either the holdout method or the cross-validation method described above will then select a subset of predictive regressors in each leaf without overfitting the training data.

The pre-designated input fields would be specified as an input to the data mining process itself. For example, in the case of a database-embedded embodiment of the present invention, the pre-designated input fields would be specified as part of the data mining query, together with the target field that is to be predicted and the other input fields whose values can be used to generate predictions.

This third embodiment of the feature transformation modules combines the advantages of the first and second embodiments of these modules. By permitting only a pre-designated subset input fields to be potentially included as regressors in the leaf regression models of the feature transform trees, the additional computational burden that results is then limited by the number of pre-designated input fields that are specified. This fact enables the additional computational burden to be controlled, and it enables this third embodiment to be utilized even when the number of input fields is very large. This third embodiment can be advantageous when certain input fields are already known to be involved in cross-product interactions, the benefits being faster convergence and improved model accuracy.

Exemplary Hardware Implementation

FIG. 15 illustrates a typical hardware configuration of an information handling/computer system in accordance with the invention and which preferably has at least one processor or central processing unit (CPU) 1511.

The CPUs 1511 are interconnected via a system bus 1512 to a random access memory (RAM) 1514, read-only memory (ROM) 1516, input/output (I/O) adapter 1518 (for connecting peripheral devices such as disk units 1521 and tape drives 1540 to the bus 1512), user interface adapter 1522 (for connecting a keyboard 1524, mouse 1526, speaker 1528, microphone 1532, and/or other user interface device to the bus 1512), a communication adapter 1534 for connecting an information handling system to a data processing network, the Internet, an Intranet, a personal area network (PAN), etc., and a display adapter 1536 for connecting the bus 1512 to a display device 1538 and/or printer 1539 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1511 and hardware above, to perform the method of the invention.

This signal-bearing media may include, for example, a RAM contained within the CPU 1511, as represented by the fast-access storage for example. Alternatively, the instructions may be contained in another signal-bearing media, such as a magnetic data storage diskette 1600 (FIG. 16), directly or indirectly accessible by the CPU 1511.

Whether contained in the diskette 1600, the computer/CPU 1511, or elsewhere, the instructions may be stored on a variety of machine-readable data storage media, such as DASD storage (e.g., a conventional "hard drive" or a RAID affay), magnetic tape, electronic read-only memory (e.g., ROM, EPROM, or EEPROM), an optical storage device (e.g. CD-ROM, WORM, DVD, digital optical tape, etc.), paper "punch" cards. In an illustrative embodiment of the invention, the machine-readable instructions may comprise software object code.

Exemplary Software Implementation

Along the lines of the above-described hardware implementation, FIG. 17 shows a block diagram 1700 of a possible computer program that might be used to implement the present invention.

Initial Model Module 1701 and stage model module 1702 serve as software templates to set up instances of the initial model 402 and successive stage models 404-40N exemplarily shown in FIG. 4.

Controller module 1703 controls the overall function of the software module, including the instantiation of the initial model and successive stage models.

GUI module 1704 allows a user to control the controller module, the entry of model data (e.g., using data input module 1705), and the disposition of the model output data (e.g., using data output module 1706).

Exemplary Implementation of Services Based on the Present Invention

In yet another aspect of the present invention, it will be readily recognized by one of ordinary skill in the art, after having read the present application, that the present invention could form the basis for commercial services. Thus, for example, and using the exemplary data mining and predictive modeling scenarios discussed above, a business method or service could be based on data mining as using the technique of the present invention.

This service could be implemented on the Internet, in which the technique of the present invention becomes the basis for providing a service that mines a database provided by a client.

Along this line, another aspect of a service might be that of providing computer tools and software modules that incorporate the techniques of the present invention. All of these variations on providing a service, including only partial contribution to the service and including variations that would be envisioned by one of ordinary skill in the art after reading this specification, are intended as being encompassed by the present invention.

While the invention has been described in terms of a single preferred embodiment, those skilled in the art will recognize that the invention can be practiced with modification within the spirit and scope of the appended claims.

Further, it is noted that, Applicants' intent is to encompass equivalents of all claim elements, even if amended later during prosecution.

The invention claimed is:

1. A predictive model method, comprising:
   receiving first input data into an initial model to develop an initial model output;
   receiving second input data and said initial model output as inputs into a first boosting stage to develop an improvement to said initial model output, said second input data comprising one of said first input data, data not included in said first input data, and a combination thereof; and
   outputting a model output resulting from a final boosting stage being one of:
      said first boosting stage; and
      a final one of boosting stages successively receiving model output data from a preceding boosting stage.

2. The method of claim 1, wherein said first boosting stage comprises a transform/regression stage that comprises:
   a feature transform stage receiving said second input data and said initial model output;
   a linear regression stage receiving an output of said feature transform stage; and
   an output summing node receiving as inputs said initial model output and an output of said linear regression stage, an output of said output summing node comprising a first boosting stage model output.

3. The method of claim 2, further comprising:
   successively providing, for one or more transform/regression stages, an output of a preceding transform/regression stage as an input into a succeeding transform/regression stage.

4. The method of claim 3, wherein for at least one said one or more transform/regression stages, a third input into said succeeding transform/regression stage comprises an output of said linear regression stage of a preceding transform/regression stage.

5. The method of claim 3, further comprising:
   avoiding an overfitting in said predictive model by determining when a successive transform/regression stage does not add to a performance of said predictive model.

6. The method of claim 5, wherein said determining of performance degradation comprises a holdout method, said holdout method comprising:
   dividing an available data into a training set and a holdout data set;
   using said training set to estimate a model parameter and to construct an alternative model structure; and
   using said holdout data set to make a selection among said alternative model structure.

7. The method of claim 5, wherein said determining of performance degradation comprises a cross-validation method, said cross-validation method comprising:
   dividing an available data into a plurality of folds of data; and
   successively, using each said fold as a holdout data set, and a remaining data not in said fold is used as a training data set to estimate model parameters and to construct alternative model structures and said training data set is used to make a selection among said alternative model structures.

8. A predictive modeling method, comprising:
   establishing an initial model module to instance an initial model;
   establishing a boosting stage model module to instance a boosting stage model for each of one or more successive boosting stages, wherein at least one instanced boosting stage model receives, as input, an input data and an output from at least one of said initial model and a preceding boosting stage mode; and
   providing an output resulting from a final boosting stage of said one or more successive boosting stages to be an output of the predictive model.

9. The method of claim 8, wherein at least one said boosting stage model feeds forward a second output as another input into at least one succeeding boosting stage model.

10. The method of claim 8, further comprising:
    instancing said initial model;
    successively instancing one or more of said boosting stage models to be successive boosting stage models, each said boosting stage model receiving, as input, an output from at least one of said initial model and a preceding boosting stage model;
    providing an input data as input to said initial model; and
    for each successive boosting stage model, providing an input data as input to said successive boosting stage model.

11. The method of claim 10, further comprising:
    determining when an additional successive boosting stage would not add to a performance of the predictive model.

12. The method of claim 11, wherein said determining of performance degradation comprises a holdout method, said holdout method comprising:
    dividing an available data into a training set and a holdout data set;
    using said training set to estimate a model parameter and to construct alternative model structures; and
    using said holdout data set to make a selection among said alternative model structures.

13. The method of claim 11, wherein said determining of performance degradation comprises a cross-validation method, said cross-validation method comprising:
    dividing an available data into a plurality of folds of data;
    successively, using each said fold as a holdout data set, and a remaining data not in said fold is used as a training data set to estimate model parameters and to construct alternative model structures and said training data set is used to make a selection among said alternative model structures.

14. The method of claim 8, wherein said boosting stage model comprises:
- a first data input port;
- a second data input port;
- a feature transform stage receiving data from said first data input port and said second data input port;
- a linear regression stage receiving an output from said feature transform stage;
- a summing node receiving data from said first data input port and output data from said linear regression stage; and
- an output port receiving data outputted from said summing node.

15. The method of claim 14, wherein said boosting stage model further comprises:
- a second output port to provide said output data from said linear regression stage to be a second output from said boosting stage model; and
- one or more input ports to receive data from said second output port of preceding boosting stages to be input data into said feature transform stage.

16. An apparatus to perform a predictive modeling method, said apparatus comprising:
- an initial model module to instance an initial model;
- a boosting stage model module to instance a boosting stage model for each of one or more successive boosting stages, wherein at least one said boosting stage model receives a data input and an input from a preceding boosting stage model;
- a controller to cause said initial model and each of one or more said successive boosting stage models to be instanced and to interconnect said initial model and said plurality of successive boosting stage models; and
- a graphic user interface to allow a user to control said controller and said predictive modeling method, to input data into said initial model, and to at least one of display, print, and save to one of a printer, a data file, and an application program the output resulting from a final one of said successive boosting stage models.

17. A machine-readable medium tangibly embodying a program of machine-readable instructions executable by a digital processing apparatus to perform a predictive modeling method, said instructions comprising:
- an initial model module to instance an initial model;
- a boosting stage model module to instance a boosting stage model for each of one or more successive boosting stages, wherein at least one instanced boosting stage model receives, as input, a data input and an output from at least one of said initial model and a preceding boosting stage model;
- causing said initial model and each of one or more said successive boosting stage models to be instanced and to appropriately interconnect said initial model and said successive boosting stage models;
- allowing a user to control said controller and said predictive modeling method, to input data into said initial model, and to one of display, print, and save to one of a printer, a data file, a memory, and an application program the output resulting from a final one of said successive boosting stage models;
- receiving input data; and
- allowing the output data of said predictive modeling method to be provided as output data.

18. A method of providing a service, said method comprising at least one of:
- providing an execution of a predictive modeling method, wherein said predictive modeling method comprises:
  - establishing an initial model module to instance an initial model;
  - establishing a boosting stage model module to instance a boosting stage model for each of one or more successive boosting stages, wherein at least one instanced boosting stage model receives, as input, an input data and an output from at least one of said initial model or a preceding boosting stage model;
  - successively providing, selectively, for one or more additional boosting stages, an output of a preceding boosting stage as an input into a succeeding boosting stage; and
  - providing an output resulting from a final boosting stage to at least one of a display device, a printer, and a memory device as comprising a result of said predictive model.

19. A method for deploying computing infrastructure, comprising integrating computer-readable code into a computing system, wherein the code in combination with the computing system is capable of performing the method of claim 1.

* * * * *